United States Patent
Yum et al.

(10) Patent No.: US 11,025,387 B2
(45) Date of Patent: *Jun. 1, 2021

(54) METHOD FOR REPORTING CSI IN WIRELESS COMMUNICATION SYSTEM AND APPARATUS THEREFOR

(71) Applicant: LG Electronics Inc., Seoul (KR)

(72) Inventors: Kunil Yum, Seoul (KR); Jiwon Kang, Seoul (KR); Kijun Kim, Seoul (KR); Hyungtae Kim, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/997,266

(22) Filed: Aug. 19, 2020

(65) Prior Publication Data

US 2020/0382255 A1 Dec. 3, 2020

Related U.S. Application Data

(63) Continuation of application No. 16/439,111, filed on Jun. 12, 2019, which is a continuation of application No. PCT/KR2018/014737, filed on Nov. 27, 2018.

(Continued)

(51) Int. Cl.
*H04L 5/00* (2006.01)
*H04W 76/27* (2018.01)
(Continued)

(52) U.S. Cl.
CPC ......... *H04L 5/0048* (2013.01); *H04B 7/0626* (2013.01); *H04B 7/0639* (2013.01); *H04W 72/042* (2013.01); *H04W 76/27* (2018.02)

(58) Field of Classification Search
None
See application file for complete search history.

(56) References Cited

U.S. PATENT DOCUMENTS 9,136,997 B2  9/2015  Gaal et al.
9,350,476 B2  5/2016  Lee et al.
(Continued)

FOREIGN PATENT DOCUMENTS

KR  1020140146507  12/2014
WO  WO2017171305  10/2017
WO  WO2019103562  5/2019

OTHER PUBLICATIONS

Ericsson, "Type I and Type II CSI reporting," R1-1714284, 3GPP TSG-RAN WG1 #90, Prague, Czech Republic, Aug. 21-25, 2017, 9 pages.

(Continued)

*Primary Examiner* — Bunjob Jaroenchonwanit
(74) *Attorney, Agent, or Firm* — Fish & Richardson P.C.

(57) ABSTRACT

This specification provides a method for transmitting, by a user equipment (UE), a CSI (Channel State Information) report in a wireless communication system. More specifically, the method includes: receiving, from a base station, downlink control information (DCI) including information for triggering the CSI report; computing CSI based on the number of symbols related to a time for computing the CSI; and transmitting the CSI report to the base station, in which the number of symbols related to the time for computing the CSI is defined based on information for the number of antenna ports, information for a CSI-RS resource, information for a bandwidth granularity, and information for a CSI codebook type.

12 Claims, 17 Drawing Sheets

Related U.S. Application Data

(60) Provisional application No. 62/591,176, filed on Nov. 27, 2017.

(51) Int. Cl.
  *H04B 7/06* (2006.01)
  *H04W 72/04* (2009.01)

(56) References Cited

U.S. PATENT DOCUMENTS

| | | | |
|---|---|---|---|
| 9,455,811 B2 | 9/2016 | He et al. | |
| 10,020,860 B2* | 7/2018 | Onggosanusi | H04B 7/0478 |
| 2013/0258964 A1* | 10/2013 | Nam | H04L 1/0053 |
| | | | 370/329 |
| 2013/0279363 A1 | 10/2013 | Huang et al. | |
| 2013/0336152 A1 | 12/2013 | Zhu et al. | |
| 2014/0185527 A1 | 7/2014 | Kim et al. | |
| 2014/0198675 A1 | 7/2014 | He et al. | |
| 2014/0328426 A1* | 11/2014 | Kim | H04L 5/0057 |
| | | | 375/267 |
| 2015/0249972 A1 | 9/2015 | You et al. | |
| 2015/0257132 A1 | 9/2015 | Park et al. | |
| 2015/0327247 A1 | 11/2015 | Chen et al. | |
| 2015/0351082 A1 | 12/2015 | Gaal et al. | |
| 2016/0094326 A1 | 3/2016 | Moon et al. | |
| 2016/0150509 A1 | 5/2016 | You et al. | |
| 2016/0261325 A1 | 9/2016 | Ko et al. | |
| 2017/0006525 A1 | 1/2017 | Ruiz Delgado et al. | |
| 2018/0227031 A1 | 8/2018 | Guo et al. | |
| 2018/0262313 A1 | 9/2018 | Nam et al. | |
| 2018/0278317 A1 | 9/2018 | Onggosanusi et al. | |
| 2019/0052321 A1* | 2/2019 | Wang | H04B 7/0417 |
| 2019/0053089 A1* | 2/2019 | Kwak | H04W 24/10 |
| 2019/0058557 A1 | 2/2019 | Muruganthan et al. | |
| 2019/0103904 A1 | 4/2019 | Song et al. | |
| 2019/0116588 A1 | 4/2019 | Xiong et al. | |
| 2019/0141559 A1 | 5/2019 | Tang et al. | |
| 2019/0149213 A1 | 5/2019 | Zhou et al. | |
| 2019/0149291 A1 | 5/2019 | Xiong et al. | |
| 2019/0149296 A1 | 5/2019 | Mazzarese et al. | |
| 2019/0158205 A1 | 5/2019 | Sheng et al. | |
| 2019/0158243 A1 | 5/2019 | Bjorkegren et al. | |
| 2019/0215897 A1 | 7/2019 | Babaei et al. | |
| 2019/0222349 A1 | 7/2019 | Gao et al. | |
| 2019/0319758 A1* | 10/2019 | Yum | H04B 7/0639 |
| 2019/0364546 A1* | 11/2019 | Kwak | H04W 72/042 |
| 2019/0380114 A1* | 12/2019 | Yokomakura | H04L 5/0057 |

OTHER PUBLICATIONS

Extended European Search Report in European Appln. No. 18881392.7, dated Jul. 6, 2020, 9 pages.

LG Electronics, "Discussion on CSI timing," R1-1700473, 3GPP TSG RAN WG1 NR Ad-Hoc Meeting, Spokane, USA, Jan. 16-20, 2017, 5 pages.

LG Electronics, Views on CSI acquisition for NR, R1-1609253, 3GPP TSG RAN WG1 Meeting #86b, Lisbon, Portugal Oct. 10-14, 2016, 7 pages.

MediaTek Inc., "Remaining details for CSI reporting," R1-1719564, 3GPP TSG RAN WG1 Meeting 91, Reno, USA, Nov. 27-Dec. 1, 2017, 6 pages.

Nokia, Alcatel-Lucent Shanghai Bell, "On the CSI timing relationships," R1-1708919, 3GPP TSG RAN WG1#89, Hangzhou, P.R. China, May 15-19, 2017, 4 pages.

Qualcomm Incorporated, "Details of CSI framework," R1-1708589, 3GPP TSG RAN WG1 #89, Hangzhou, China, May 15-19, 2017, 7 page.

Ericsson, "Remaining issues with RRC impact in CSI reporting (AI 7.2.2.2)," R1-1719029, 3GPP TSG RAN WG1 Meeting 90bis, Prague, CZ, Oct. 9-13, 2017, 3 pages.

Huawei, HiSilicon, "Link adaption and CSI reporting for URLLC transmission," R1-1717093, 3GPP TSG RAN WG1 Meeting #90bis, Prague, Czech Republic, Oct. 9-13, 2017, 10 pages.

Japanese Office Action in Japanese Appln. No. 2019-534939, dated Aug. 18, 2020, 6 pages (with English translation).

* cited by examiner

METHOD FOR REPORTING CSI IN WIRELESS COMMUNICATION SYSTEM AND APPARATUS THEREFOR

CROSS-REFERENCE TO RELATED APPLICATIONS

This application is a continuation of U.S. application Ser. No. 16/439,111, filed on Jun. 12, 2019, which is a continuation of International Application No. PCT/KR2018/014737, filed on Nov. 27, 2018, which claims the benefit of U.S. Provisional Application No. 62/591,176, filed on Nov. 27, 2017, the contents of which are all hereby incorporated by reference herein in their entirety.

TECHNICAL FIELD

This specification relates to a wireless communication system, and more particularly, to a method for reporting channel state information (CSI) and an apparatus for supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

This specification provides a method for setting different CSI feedback timings depending on information included in CSI feedback such as the number of antenna ports, a CSI codebook type, or the like.

The technical objects of the present invention are not limited to the aforementioned technical objects, and other technical objects, which are not mentioned above, will be apparently appreciated by a person having ordinary skill in the art from the following description.

Technical Solution

This specification provides a method for transmitting a CSI (Channel State Information) report in a wireless communication system.

The method performed by UE includes: receiving, from a base station, downlink control information (DCI) including information for triggering the CSI report; computing CSI based on the number of symbols related to a time for computing the CSI; and transmitting, to the base station, the CSI report, in which the number of symbols related to the time for computing the CSI is defined based on information for the number of antenna ports, information for a CSI-RS resource, information for a bandwidth granularity, and information for a CSI codebook type.

Furthermore, in this specification, the method further includes receiving, from the base station, control information including at least one of the information for the number of antenna ports, the information for the CSI-RS resource, the information for the bandwidth granularity, and the information for the CSI codebook type.

Furthermore, in this specification, the control information is included in RRC signaling.

Furthermore, in this specification, the bandwidth granularity is related to a wideband or a subband.

Furthermore, in this specification, the CSI codebook type is related to CSI codebook type 1 or CSI codebook type 2.

Furthermore, a UE transmitting a CSI (Channel State Information) report in a wireless communication system includes: a radio frequency (RF) module transmitting and receiving a radio signal; and a processor functionally connected with the RF module, in which the processor is configured to receive, from a base station, downlink control information (DCI) including information for triggering the CSI report, compute CSI based on the number of symbols related to a time for computing the CSI, and transmit, to the base station, the CSI report, and the number of symbols related to the time for computing the CSI is defined based on information for the number of antenna ports, information for a CSI-RS resource, information for a bandwidth granularity, and information for a CSI codebook type.

Furthermore, in this specification, the processor receives, from the base station, control information including at least one of the information for the number of antenna ports, the information for the CSI-RS resource, the information for the bandwidth granularity, and the information for the CSI codebook type.

Furthermore, in this specification, the control information is included in RRC signaling.

Furthermore, in this specification, the bandwidth granularity is related to a wideband or a subband.

Furthermore, in this specification, the CSI codebook type is related to CSI codebook type 1 or CSI codebook type 2.

Advantageous Effects

According to this specification, different feedback timings are set depending on information included in CSI feedback to perform dynamic CSI reporting.

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1A:
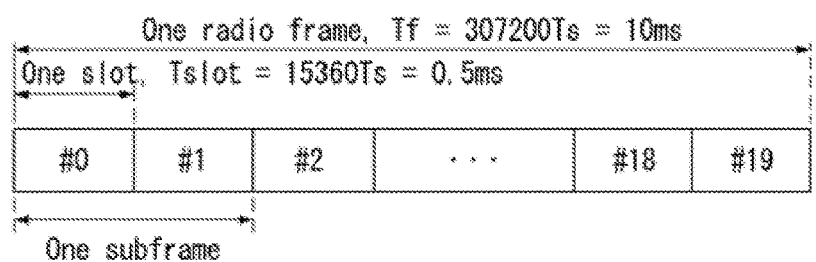
FIGS. 1A and 1B are views illustrating a structure a radio frame in a wireless communication system to which the present invention can be applied.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), general NB (gNB) and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11 (Wi-Fi), IEEE 802.16(WiMAX), IEEE 802-20, E-UTRA(Evolved UTRA), and the like.

The UTRA is a part of a universal mobile telecommunication system (UMTS). $3^{rd}$ generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE. 5G NR defines Enhanced Mobile Broadband (eMBB), Massive Machine Type Communications (mMTC), Ultra-Reliable and Low Latency Communications (URLLC), and vehicle-to-everything (V2X) according to a usage scenario.

In addition, the 5G NR standard is divided into standalone (SA) and non-standalone (NSA) depending on co-existence between the NR system and the LTE system.

In addition, the 5G NR supports various subcarrier spacings, and supports CP-OFDM in the downlink and CF-OFDM and DFT-s-OFDM (SC-OFDM) in the uplink.

Embodiments of the present invention may be supported by standard documents disclosed in at least one of wireless access systems IEEE 802, 3GPP, and 3GPP2. That is, steps or portions of the embodiments of the present invention which are not described in order to clearly illustrate the technical spirit of the present invention may be supported by the documents. Further, all terms disclosed in the document may be described by the standard document.

For clarity of description, 3GPP LTE/LTE-A is mainly described, but the technical features of the present invention are not limited thereto.

DEFINITION OF TERMS eLTE eNB: The eLTE eNB is the evolution of an eNB that supports connections to Evolved Packet Core (EPC) and Next Generation Core (NGC).

gNB: Node that supports the NR as well as connection to the NGC.

New RAN: Wireless access network that supports the E-UTRA or interacts with the NGC.

Network slice: The network slice is a network defined by an operator to provide an optimized solution for a specific market scenario that requires specific requirements with end-to-end coverage.

Network function: The network function is a logic node in a network infrastructure having a well defined external interface and a well defined functional operation.

NG-C: Control plane interface used for an NG2 reference point between new RAN and the NGC.

NG-U: User plane interface used for an NG3 reference point between the new RAN and the NGC.

Non-standalone NR: Arrangement configuration in which gNB requests an LTE eNB as an anchor for EPC control plane connection or an eLTE eNB as the anchor for the control plane connection to the NGC.

Non-standalone E-UTRA: Arrangement configuration in which the eLTE eNB requires the gNB as the anchor for the control plane connection to the NGC.

User plane gateway: Endpoint of NG-U interface.

Numerology: Corresponds one subcarrier spacing in a frequency domain. Different numerology may be defined by scaling reference subcarrier spacing to an integer N.

NR: NR Radio Access or New Radio

Overview of System

Figure 1B:
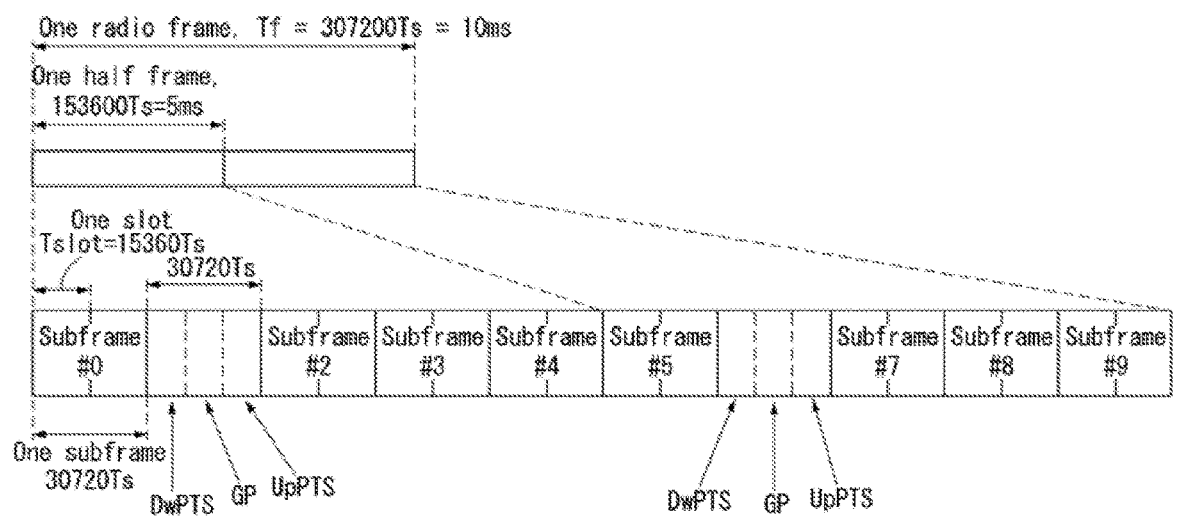

FIGS. 1A and 1B illustrate a structure of a radio frame in a wireless communication system to which the present invention can be applied.

A 3GPP LTE/LTE-A supports radio frame structure type 1 applicable to frequency division duplex (FDD) and radio frame structure type 2 applicable to time division duplex (TDD).

In FIGS. 1A and 1B, the size of the radio frame in the time domain is represented by a multiple of a time unit of $T\_s=1/(15000*2048)$. The downlink and uplink transmissions are configured by a radio frame having an interval of $T\_f=307200*T\_s=10$ ms.

FIG. 1A above illustrates the structure of radio frame type 1. Radio frame type 1 may be applied to both full duplex and half duplex FDDs.

The radio frame is constituted by 10 subframes. One radio frame is constituted by 20 slots having a length of $T\_slot=15360*T\_s=0.5$ ms and indexes of 0 to 19 are granted to each slot. One subframe is constituted by two consecutive slots in the time domain and subframe i is constituted by slot 2i and slot 2i+1. A time required for transmitting one subframe is referred to as a transmission time interval (TTI). For example, a length of one subframe may be 1 ms and the length of one slot may be 0.5 ms.

In the FDD, the uplink transmission and the downlink transmission are classified in the frequency domain. There is no limit in the full duplex FDD, while in a half duplex FDD operation, the UE may not perform transmission and reception simultaneously.

One slot includes a plurality of orthogonal frequency division multiplexing (OFDM) symbols in the time domain and includes multiple resource blocks (RBs) in the frequency domain. Since the 3GPP LTE uses OFDMA in the downlink, the OFDM symbol is intended to represent one symbol period. The OFDM symbol may be referred to as one SC-FDMA symbol or symbol period. A resource block as a resource allocation unit includes a plurality of consecutive subcarriers in one slot.

FIG. 1B illustrates frame structure type 2.

Radio frame type 2 is constituted by two half frames each having a length of $153600*T\_s=5$ ms. Each half frame is constituted by 5 subframes having a length of $30720*T\_s=1$ ms.

In frame structure type 2 of the TDD system, an uplink-downlink configuration is a rule indicating whether the uplink and the downlink are assigned (or reserved) for all subframes.

Table 1 shows an uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of the radio frame, 'D' denotes a subframe for the downlink transmission, 'U' denotes a subframe for the uplink transmission, 'S' denotes a special subframe constituted by three fields, i.e., a downlink pilot time slot (DwPTS), a guard period (GP), and an uplink pilot time slot (UpPTS).

The DwPTS is used for initial cell search, synchronization, or channel estimation in the UE. The UpPTS is used to match the channel estimation at the base station and uplink transmission synchronization of the UE. The GP is a period for eliminating interference caused in the uplink due to a multi-path delay of a downlink signal between the uplink and the downlink.

Each subframe i is constituted by slot 2i and slot 2i+1 each having a length of $T\_slot=15360*T\_s=0.5$ ms.

The uplink-downlink configuration may be divided into 7 types and locations and/or the numbers of downlink subframes, special subframes, and uplink subframes vary for each configuration.

A point when the downlink is changed to the uplink or a point when the uplink is switched to the downlink is referred to as a switching point. Switch-point periodicity of the switching point means a period in which an aspect in which the uplink subframe and the downlink subframe are switched is similarly repeated and both 5 ms and 10 ms are supported.

When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and a subframe immediately following the subframe are always periods for the uplink transmission.

The uplink-downlink configuration as system information may be known by both the base station and the UE. The eNB transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and the configuration information as broadcast information may be commonly transmitted to all UEs in a cell through broadcast channel.

Table 2 shows a configuration (the length of DwPTS/GP/UpPTS) of the special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | Dw PTS | Normal cyclic prefix in uplink | Extended cyclic prefix in uplink | Dw PTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | | — |
| 8 | $24144 \cdot T_s$ | | | — | | — |

The structure of the radio frame according to the example of FIG. 1 is merely an example and the number of subcarriers included in the radio frame or the number of slots included in the subframe, and the number of OFDM symbols included in the slot may be variously changed.

Figure 2:
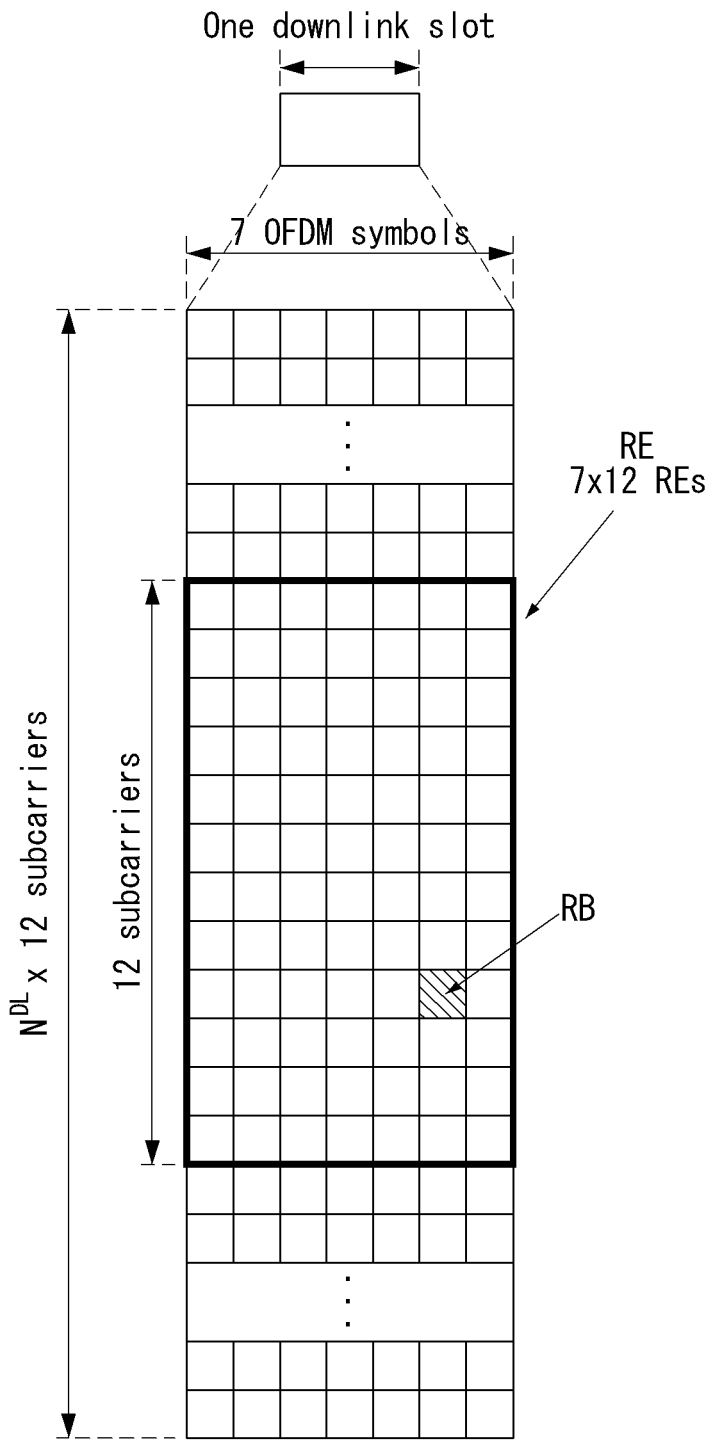
FIG. 2 is a view illustrating a resource grid for one downlink slot in a wireless communication system to which the present invention can be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, $N^{DL}$ is subordinated to a downlink transmission bandwidth.

A structure of the uplink slot may be the same as that of the downlink slot.

Figure 3:
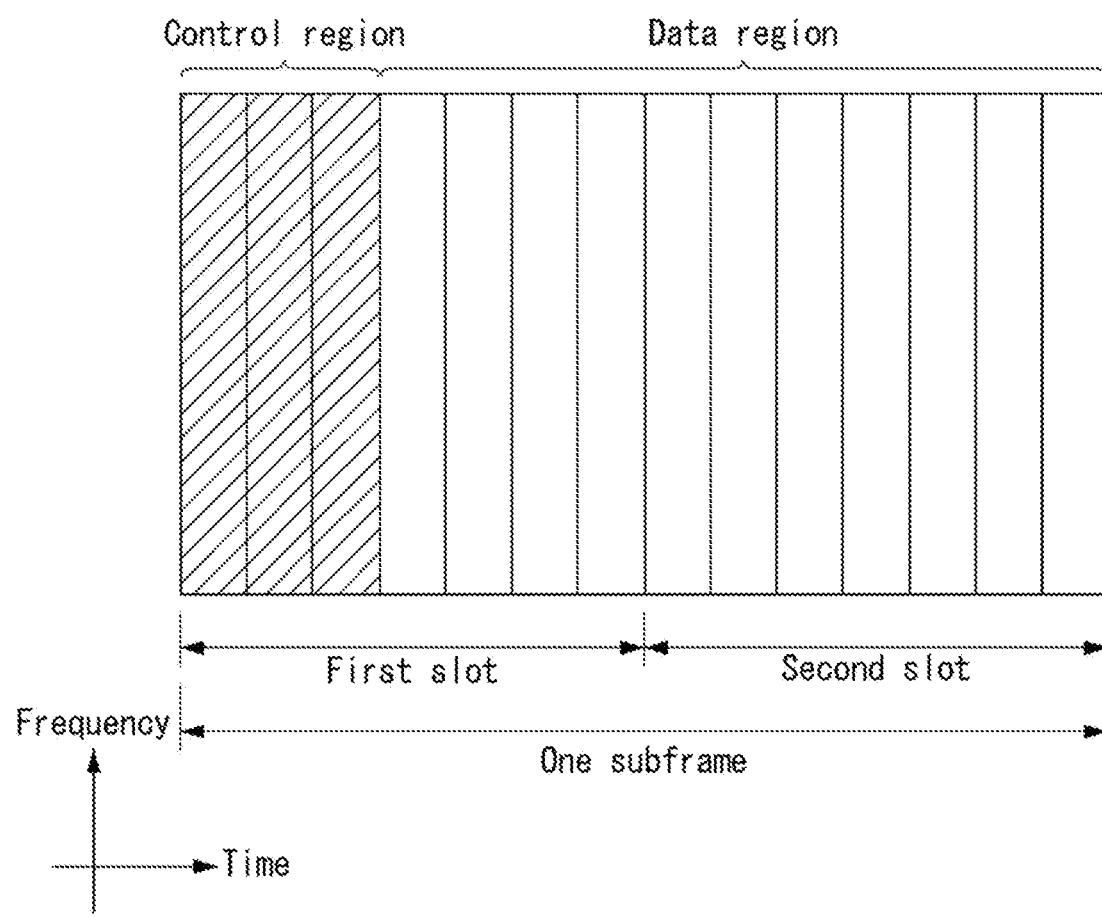
FIG. 3 is a view illustrating a structure of a downlink subframe in a wireless communication system to which the present invention can be applied.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

The enhanced PDCCH (EPDCCH) carries UE-specific signaling. The EPDCCH is located in a physical resource block (PRB) that is configured to be UE specific. In other words, as described above, the PDCCH may be transmitted in up to three OFDM symbols in the first slot in the subframe, but the EPDCCH can be transmitted in a resource region other than the PDCCH. The time (i.e., symbol) at which the EPDCCH starts in the subframe may be configured in the UE via higher layer signaling (e.g., RRC signaling, etc.).

The EPDCCH may carry a transport format, resource allocation, and HARQ information associated with DL-SCH, a transport format, resource allocation, and HARQ information associated with UL-SCH, resource allocation information associated with Sidelink Shared Channel (SL-SCH) and Physical Sidelink Control Channel (PSCCH), etc. Multiple EPDCCHs may be supported and the UE may monitor the set of EPCCHs.

The EPDCCH may be transmitted using one or more successive enhanced CCEs (ECCEs) and the number of ECCEs per EPDCCH may be determined for each EPDCCH format.

Each ECCE may be constituted by a plurality of enhanced resource element groups (EREGs). The EREG is used for defining mapping of the ECCE to the RE. There are 16 EREGs per PRB pair. All REs are numbered from 0 to 15 in the order in which the next time increases in the order in which the frequency increases, except for the RE carrying the DMRS in each PRB pair.

The UE may monitor a plurality of EPDCCHs. For example, one or two EPDCCH sets may be configured in one PRB pair in which the UE monitors EPDCCH transmission.

Different coding rates may be implemented for the EPCCH by merging different numbers of ECCEs. The EPCCH may use localized transmission or distributed transmission, and as a result, the mapping of the ECCE to the RE in the PRB may vary.

Figure 4:
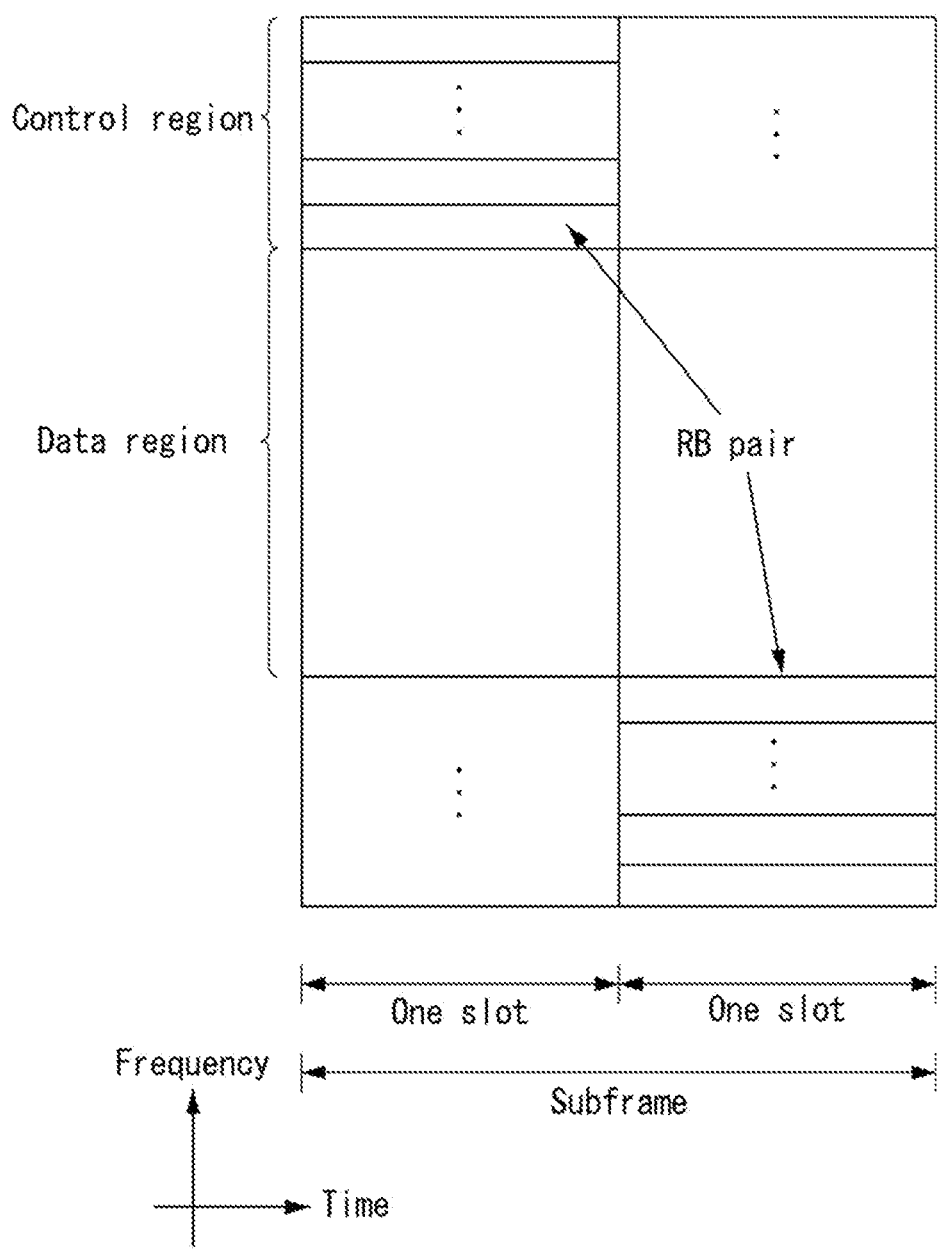
FIG. 4 is a view illustrating a structure of an uplink subframe in a wireless communication system to which the present invention can be applied.

FIG. 4 illustrates a structure of an uplink subframe in a wireless communication system to which the present invention can be applied.

Referring to FIG. 4, the uplink subframe may be divided into the control region and the data region in the frequency domain. A physical uplink control channel (PUCCH) carrying the uplink control information is allocated to the control region. A physical uplink shared channel (PUSCH) carrying the user data is allocated to the data region. In order to maintain a single carrier characteristic, one UE does not transmit the PUCCH and the PUSCH at the same time.

A resource block pair within the subframe is allocated to the PUCCH for one UE. RBs belonging to the RB pair occupy different subcarriers in each of two slots. In this case, the RB pair allocated to the PUCCH frequency-hops in a slot boundary.

Downlink Channel State Information (CSI) Feedback

In a current LTE standard, there are two transmission types of open-loop MIMO and closed-loop MIMO without channel information.

In the closed-loop MIMO, each of a transmitter and a receiver performs beamforming based on channel information, i.e., CSI in order to obtain a multiplexing gain of an MIMO antenna.

The eNB instructs the UE to allocate the physical uplink control channel (PUCCH) or the physical uplink shared channel (PUSCH) and feed back the downlink CSI in order to obtain the CSI.

The CSI is roughly categorized into three information: Rank Indicator (RI), Precision Matrix Index (PMI), and Channel Quality Indication (CQI).

First, the RI represents rank information of a channel, which means the number of streams received by the UE through the same time-frequency resource.

Since this value is dominantly determined by long term fading of the channel, the value is fed back from the UE to the eNB with a period usually longer than the PMI and the CQI.

Next, the PMI is a value reflecting a channel space characteristic and represents a precoding index of the eNB preferred by the UE based on a metric such as SINR, etc.

Next, the CQI is a value representing the strength of the channel, and generally refers to a reception SINR that may be obtained when the eNB uses the PMI.

In a more advanced communication system such as LTE-A, obtaining of additional multi-user diversity using multi-user MIMO (MU-MIMO) is added.

To this end, higher accuracy is required in terms of channel feedback.

The reason is that in the MU-MIMO, an interference channel exists between the UEs multiplexed in an antenna domain, so that feedback channel accuracy greatly affects not only the UE that raises the feedback but also the interference of other multiplexed UEs.

Accordingly, in LTE-A, it is determine to design a final PMI to be divided into W1 which is a long term and/or wideband PMI and W2 which is a short term and/or subband PMI in order to increase feedback channel accuracy.

A codebook is transformed by using a long-term covariance matrix of the channel as follows as an example of a hierarchical codebook transformation scheme configuring one final PMI from two channel information.

Equation 1

$$W = \text{norm}(W1\,W2) \quad (1)$$

In Equation 1 above, W2 (=short term PMI) is a codeword of a codebook made to reflect short-term channel information, W is a codebook of a final transformed codebook, and norm(A) means a matrix in which a norm for each column of a matrix A is normalized to 1.

A specific structure of the existing W1 and W2 is described below.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{Equation 2}$$

$$W2(j) = \begin{bmatrix} \overbrace{e_M^k \quad e_M^l \quad \cdots \quad e_M^m}^{r \text{ columns}} \\ \alpha_j e_M^k \quad \beta_j e_M^l \quad \gamma_j e_M^m \end{bmatrix} \text{ (if rank = } r\text{),}$$

where $1 \leq k, l, m \leq M$ and $k, l, m$ are integer.

The codeword structure is designed to reflect the correlation characteristics of channels using a cross polarized antenna and when a spacing between the antennas is narrow (usually when the distance between adjacent antennas is less than half of a signal wavelength).

In the case of the cross polarized antenna, the antenna may be divided into a horizontal antenna group and a vertical antenna group and each antenna group has a characteristic of a uniform linear array (ULA) antenna, and two antenna groups are co-located.

Therefore, a correlation between the antennas of each group has the same linear phase increment (LPI) characteristic, and the correlation between the antenna groups has a phase rotation characteristic.

Since the codebook is consequently a quantized value of the channel, it is necessary to design the codebook reflecting the characteristics of the channel corresponding to a source as it is. For convenience of description, it may be confirmed that the channel characteristic is reflected in a codeword satisfying Equation 2 by taking a rank 1 codeword made of the above structure as an example.

$$W1(i) * W2(j) = \begin{bmatrix} X_i(k) \\ \alpha_j X_i(k) \end{bmatrix} \quad \text{Equation 3}$$

In Equation 3 above, the codeword is expressed by a vector of Nt (number of Tx antennas) by 1 and is structured into two vectors, i.e., a higher vector $X_i(k)$ and a lower vector $X_i(k)$ and each vector shows a correlation characteristic of a horizontal antenna group and a vertical antenna group.

$X_i(k)$ is advantageous to be expressed as a vector having linear phase increment by reflecting the correlation characteristic between the antennas of each antenna group and may use a DFT matrix as a representative example.

Further, higher channel accuracy is required even for CoMP.

In case of CoMP JT, since several eNBs cooperatively transmit the same data to a specific UE, theoretically, the CoMP JT may be regarded as an MIMO system in which the antennas are geographically dispersed.

That is, in the case of MU-MIMO in JT, a high level of channel accuracy is required in order to avoid co-scheduling inter-UE interference like single cell MU-MIMO.

Further, in the case of CoMP CB, sophisticated channel information is also required to avoid interference which an adjacent cell gives to the serving cell.

Restricted RLM and RRM/CSI Measurement

As A method for interfering coordination, an aggressor cell may use a silent subframe (may be referred to as almost blank subframe (ABS) that reduces transmission power/activity of some physical channels (including even an operation of setting transmission power/activity to zero power) and a victim cell may perform time domain inter-cell interference coordination of scheduling the UE by considering the silent subframe.

In this case, the interference level may vary greatly depending on the subframe in the victim cell UE.

In this case, in order to perform a radio resource management (RRM) operation to measure more accurate radio link monitoring (RLM) or RSRP/RSRQ in each subframe or to measure channel state information (CSI) for link adaptation, the monitoring/measurement needs to be limited to sets of subframes having uniform interference characteristics.

In the 3GPP LTE system, restricted RLM and RRM/CSI measurements are defined as below.

UE Procedure for Reporting Channel State Information (CSI)

Time and frequency resources may be used by the UE in order to report a CSI constituted by the CQI, the PMI, and/or the RI controlled by the eNB.

For spatial multiplexing, the UE needs to determine the RI corresponding to the number of transmission layers.

In this case, the RI is equal to 1 for transmission diversity.

When the UE is configured to transmission mode 8 or 9, the UE may perform or not perform PMI/RI reporting by a higher layer parameter pmi-RI-Report.

When the subframe is constituted by $c_{CSI,0}$ and $c_{CSI,0}$ in the higher layer, the UE may be configured by resource-restricted CSI measurements.

In this case, CSI reporting may be periodic or aperiodic.

When the UE is constituted by one or more serving cells, the CSI may be transmitted only in an activated serving cell.

When the UE is not configured for PUSCH and PUCCH transmission at the same time, the UE needs to periodically report the CSI for the PUCCH in a subframe in which the PUSCH is not allocated as described later.

When the UE is not configured for the PUSCH and PUCCH transmission at the same time, the UE needs to report a periodic CSI for the PUSCH of a serving cell having the minimum servcell index in a subframe in which the PUSCH is allocated.

In this case, the UE needs to use a periodic CSI reporting format based on the same PUCCH for the PUSCH.

When the UE satisfies a specific condition stated thereafter, the UE needs to perform aperiodic CSI reporting through the PUSCH.

Aperiodic CQI/PMI reporting and RI reporting are transmitted only when a CSI feedback type supports the RI reporting.

A set of UE subbands may evaluate CQI reporting corresponding to an entire downlink system bandwidth.

The subband is a set constituted by k PRBs and in this case, k is a function of a system bandwidth.

In a last subband of S set, the number of consecutive PRBs may be smaller than k according to $N_{RB}^{DL}$.

The number of system bandwidths given by $N_{RB}^{DL}$ may be defined as $N = \lceil N_{RB}^{DL}/k \rceil$.

The subbands need to be indexed in an order in which the frequency increases from the minimum frequency and in an order in which the size does not increase.

Table 3 is a table showing a subband size (k) and a configuration of the system bandwidth.

TABLE 3

| System Bandwidth $N_{RB}^{DL}$ | Subband Size (k) |
|---|---|
| 6-7 | NA |
| 8-10 | 4 |
| 11-26 | 4 |

TABLE 3-continued

| System Bandwidth $N_{RB}^{DL}$ | Subband Size (k) |
|---|---|
| 27-63 | 6 |
| 64-110 | 8 |

Aperiodic CSI Reporting Using PUSCH

When the UE performs decoding in subframe n, the UE may perform any one aperiodic CSI reporting of the following aperiodic CSI reporting using a subframe n+k PUSCH of serving cell c.

an uplink DCI format, or a Random Access Response Grant,

Each CSI request field is set to trigger a report and used to provide the serving cell c when not reserved.

When the CSI request field is 1 bit, the CSI request field is set to 1 and the reporting for serving cell c is triggered.

When the CSI request field size is 2 bits, the report is triggered according to the value of Table 4.

The UE does not expect to receive one or more aperiodic CSI report requests for a given subframe.

Table 4 shows a CSI request field for a PDCCH having an uplink DCI format in a search space.

TABLE 4

| Value of CSI request field | Description |
|---|---|
| '00' | No aperiodic CSI report is triggered |
| '01' | Aperiodic CSI report is triggered for serving cell$^c$ |
| '10' | Aperiodic CSI report is triggered for a 1st set of serving cells configured by higher layers |
| '11' | Aperiodic CSI report is triggered for a 2nd set of serving cells configured by higher layers |

In the case of new radio (NR) channel state information (CSI) reporting for the PUSCH, Part 2 information bits of partial subbands may be omitted When the priority level falls from high to low from Box #0 to Box #2N, a priority rule may be supported and omission granularity may be one box.

Here, N represents the number of CSI reports in one slot.

Further, the number of CSI reports may match a ranking in a CSI report configuration.

One of the following alternatives (Alts) may be selected for calculation of a channel quality indicator (CQI).

Alt 1: A subband CQI for each omitted subband is calculated by assuming the subband CQI as a precoding matrix indicator (PMI) of a nearest subband(s) with Part 2 reporting.

Alt 2: The subband CQI for each omitted subband is calculated by assuming the subband CQI as the PMI of the subband.

Part 1/Part 2 CSI may be defined as follows.

In the case of Type I, only single-slot reporting is available.

In this case, the CSI report is constituted by a maximum of 2 parts as follows.

Part 1: Rank indicator (RI)/CSI-RS resource indicator (CRI) and CQI for $1^{st}$ CW Part 2: PMI and CQI for $2^{nd}$ CW (in the case of RI>4)

In the case of type II, the CSI report is constituted by a maximum of 2 or 3 parts.

When 3 parts are supported, Part 1 may include the RI and CQI for 1 CW, Part 2 may include wideband amplitude information, and Part 3 may include the PMI.

When 2 parts are supported, the details of the parts needs to be further studied.

In resource allocation for CSI reporting, a payload difference between RI=1 and RI=2 needs to be considered. Both single-slot reporting and multi-slot reporting need to be considered.

A single-slot reporting principle should be maintained (CSI parameters of the report in multi-slots are not multiplexed).

In 3GPP LTE, aperiodic feedback of channel state information (CSI) may be made after 4 ms/5 ms (or a subsequent initial available UL subframe) from a subframe (i.e., a reference resource) in which an aperiodic CSI request is received.

However, it is desirable that the feedback of the CSI is performed in a shorter time (e.g., less than milliseconds) than the existing LTE, in order to prevent a CSI aging effect and to reduce the latency.

Therefore, to this end, it is considered that the eNB directly dynamically designates (or configures or indicates) a (CSI) feedback timing to the UE.

The reason is that a CSI calculation time is different depending on a case.

Here, the CSI calculation time means a time required for the UE to derive the CSI assuming the reference resource from a CSI reference resource.

For example, the CSI calculation time required by the UE may vary depending on whether the UE calculates CSI for one wideband (or subband) or calculates all CSIs for a plurality of carrier components/subbands.

Accordingly, the present invention proposes a scheme in which the eNB configures different feedback timings for the UE according to contents (e.g., feedback type, bandwidth granularity, and UE calculation capability) to be fed back in the corresponding CSI feedback.

Designation of CSI Feedback Timing According to Feedback Contents

In this specification, the CSI feedback timing is defined as a time up to a UL resource in which the UE feeds back an actual CSI from the (aperiodic) CSI request.

Figure 5A:
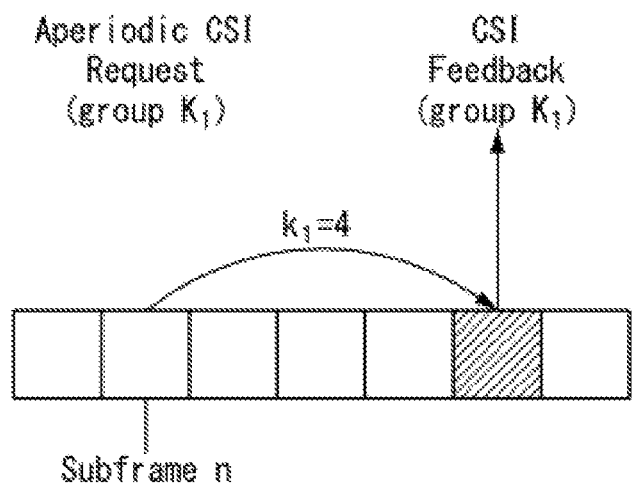
FIGS. 5A and 5B are views illustrating an example of a CSI feedback timing to which the present invention can be applied.
Figure 5B:
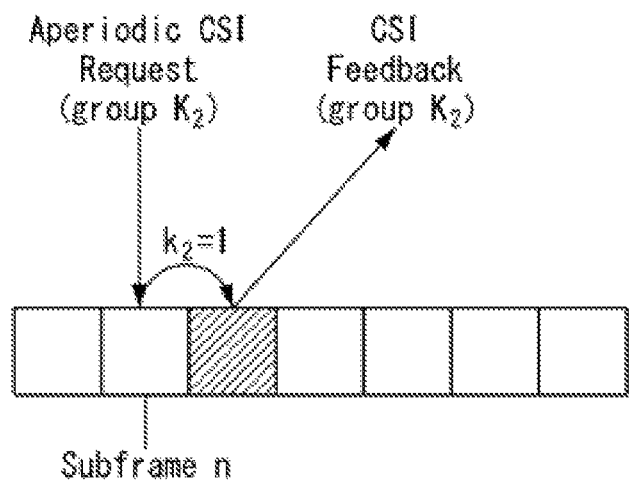

That is, like $k_1$ and $k_2$ illustrated in FIGS. 5A and 5B, the CSI feedback timing means that how long UL resource allocation for the CSI report corresponds to/is applied to a resource which is far away from a transmission time n of the aperiodic CSI request is designated.

This may be a symbol unit or a subframe unit and may be defined as a unit such as an absolute time or a mini subframe or a slot considered in new RAT.

Further, hereinafter, an (aperiodic) CSI request receiving time may be replaced with a subframe defined as a reference resource.

The meaning that the CSI feedback timing is defined as the absolute time means that a given timing may be interpreted as another unit which corresponds to the corresponding timing according to numerology.

For example, the system may support a band having a subcarrier spacing which is t times (t=1, 2, 3, . . . ) of 15 kHz and a timing value in a subcarrier spacing 15 kHz band is signaled in k (symbol unit).

In this case, the meaning is that it may be defined as t*k according to a t value of a different carrier spacing (e.g., 15 kHz carrier spacing: k, 30 kHz carrier spacing: k*2, 60 kHz carrier spacing: k*4).

When different numbers of symbols form one subframe in each carrier spacing, the number of corresponding symbols in the band using each carrier spacing may be similarly considered.

For example, in the subcarrier spacing 15 kHz band, 14 symbols may form one subframe in symbol duration T and in a subcarrier spacing 30 kHz band, 28 symbols may form one subframe in symbol duration T/2.

In this case, when k in the subcarrier spacing 15 kHz band is defined in unit of the symbol, the corresponding timing may be interpreted as 15 kHz: k and 30 kHz: 2*k and when k is defined in unit of the subframe, the corresponding timing may be interpreted as 15 kHz: k and 30 kHz: k.

(Proposal 1)

Proposal 1 designates the CSI feedback timing according to the CSI feedback type.

A base station (BS) (e.g. eNB) may designate the corresponding CSI feedback timing according to which CSI type is included in (aperiodic) CSI and reported.

For example, the BS may designate the CSI feedback timing according to granularity of feedback. To this end, a $K_1$ group (e.g., subband RI, PMI, and CQI) including feedback types for a plurality of subband CSIs and a $K_2$ group (e.g., wideband RI, PMI, and CQI) including only a feedback type for a single wideband CSI may be defined.

As another example, when the PMI, CQI, and RI of LTE are included in group $K_1$, if CRI (or port selection in the above 6 GHz region) for beam selection is calculated and selected as power measurement, a calculation time may be reduced as compared with the PMI/CQI/RI, and as a result, the CRI may be included in the group $K_2$.

In this case, each group K is a set of CSIs requested by the corresponding request when an (aperiodic) CSI request is made.

The BS designate to the UE for which group the CSI is to be reported to the corresponding (aperiodic) CSI request. The (aperiodic) CSI request in subframe n is received by the UE. When a report including a CSI (i.e., $K_1$ group) for a plurality of subbands is indicated, the UE may report the corresponding (aperiodic) CSI at a point of $n+k_1$, and when only a report for a single wideband CSI (i.e., $K_2$ group) is indicated, the UE may report the (aperiodic) CSI at a point of $n+k_2$ ($k_1 > k_2$).

As described above, the CSI feedback type may be defined as a plurality of $K_p$ ($K_1, K_2, \ldots K_i \ldots K_p$) groups. Different feedback timing $k_1, k_2, \ldots k_i \ldots k_p$ may be defined in each group.

The K group and the resulting feedback timing k may be predefined or configured with RRC. In particular, when the K group and the resulting feedback timing k are configured with the RRC, a range of a $k_i$ value which may be configured for each K group may be differently defined.

For example, like the above example, in respect to groups $K_1$ and $K_2$, group $K_1$ may be defined to be designated within a range of {3, 4, 5, 6} and group $K_2$ may be defined to be designated within a range of {1, 2, 3, 4}. In this case, the BS transmits which group the CSI is requested is included in the (aperiodic) CSI request to the UE through an (uplink) DCI.

Alternatively, the BS may designate a CSI feedback timing set $T_i$ instead of a CSI feedback timing value $k_i$ for a group $k_i$. In this case, the BS may designate an index of the CSI feedback timing together with the CSI request through the DCI.

The UE may perform the feedback at the CSI feedback timing corresponding to a signaled index among elements in $T_i$ defined in the $K_i$ group corresponding to the CSI request.

For example, for each of the groups $K_1$ and $K_2$ described in the above example, when $T_1$={3, 4, 5, 6} is defined in the group $K_1$ and $T_2$={1, 2, 3, 4} is defined in the group $K_2$, if the BS transmits feedback timing index=1 to the UE, the feedback may be performed in n+3 in the case of $K_1$ group feedback and in n+1 in the case of $K_2$ group feedback.

The corresponding feedback timing index may be included in the (aperiodic) CSI request and transmitted and in particular, jointly encoded together with another information (e.g., group indication).

Alternatively, feedback timing offset $k'_i$ for each $K_i$ group may be defined. The BS may designate the index of the CSI feedback timing together with the CSI request including the designation of the $K_i$ group through the DCI. In this case, the UE may perform the feedback at a feedback timing $n+k+k'_i$, which is a combination of the feedback timing k corresponding to the signaled CSI feedback timing index and a timing offset $k'_i$ defined in the $K_i$ group corresponding to the corresponding CSI request.

For example, T={0, 1, 2, 3} may be defined as the CSI feedback timing set, and $k'_1$=3 may be defined in group $K_1$ and $k'_2$=0 may be defined in group $K_2$ for each of groups $K_1$ and $K_2$ described in the above example. In this case, if the BS transmits feedback timing index=2 to the UE, the feedback may be performed in n+(1+3) when the feedback type of the K1 group is included in the feedback and the feedback may be performed in n+(1+0) otherwise.

The corresponding feedback timing index may be included in the (aperiodic) CSI report and jointly encoded.

As described above, when the CSI feedback timing set T which is common is defined, a minimum feedback timing $k''_i$ may be defined for each group $K_i$. The UE may perform the following operations when the designated CSI feedback timing $t_i$ is smaller than $k''_i$.

The CSI feedback is delayed up to a point of Max($n+k''_i$, $n+t_i$).

The CSI feedback is dropped.

CSI which is not updated is fed back.

In this case, units of specific $k_i$ and $k_j$ may be different from each other.

For example, $k_1$ may be a subframe unit and $k_2$ may be a symbol unit. In this case, in some cases, n may be differently interpreted. In the case of $n+k_1$, n may be a subframe in which the (aperiodic) CSI request is transmitted and in the case of $n+k_2$, n may refer to a first symbol of the subframe in which the (aperiodic) CSI request is transmitted.

$k_1, k_2, \ldots k_i \ldots k_p$ may be defined for each CSI feedback type instead of group K.

In this case, in respect to the CSI feedback timing for each group $K_p$, the largest $k_i$ among $k_1, k_2, \ldots k_i \ldots k_p$ for the CSI feedback type which belongs to the corresponding group $K_p$ may be defined as the CSI feedback timing for the corresponding group K.

In this case, p, i.e., maximum number of group K may be defined (e.g., p=2), and in this case, group indicator information may be encoded into $\log_2(p)$(e.g., 1 bit) and included in the UL DCI or jointly encoded together with another information (e.g., PQI) of the (aperiodic) CSI request.

(Proposal 2)

Proposal 2 designates the CSI feedback timing according to a CSI estimation method.

Instead of the feedback type, a method for defining the K group according to the CSI estimation method will also be available. The time required for the CSI calculation may vary depending on various CSI estimation methods considered in FD-MIMO and New RAT situations.

This includes not only implicit feedback such as the existing codebook based CSI calculation but also an explicit feedback scheme such as a scheme of directly feeding back a channel coefficient or a scheme of feeding back of (eigenvector of) a covariance matrix.

For example, implicit feedback through the ML is based on a scheme of calculating the CQI for all ranks and PMI indexes, so a relatively long CSI calculation time is required. On the contrary, in the case of explicit feedback, especially, direct feedback of the channel coefficient to the BS, large calculation is not required, so that a relatively small CSI calculation time is expected.

Accordingly, CSI feedback using CSI estimation methods having different required time is defined in different $K_1$ groups to define different $k_i$, $k'_i$, or $T_i$.

For example, by defining a scheme of reporting a CSI using a (large) codebook to the BS as group $K_1$ and a scheme of directly feeding back the channel coefficient as group $K_2$, it is possible to set $k_1=4$ and $k_2=1$, respectively. In this case, CSI reporting schemes according to two estimation methods may be defined as different feedback types and in this case, it is apparent that different $k_i$, $k'_i$, or $T_i$ may be designated and used by the scheme described in Proposal 1.

(Proposal 3)

Proposal 3 designates the CSI feedback timing according to a CSI process.

CSIs requiring different CSI feedback timing are allocated to a plurality of CSI processes and different $k_i$, $k'_i$, or $T_i$ may be designated according to each CSI process.

For example, CSI process 1 may include subband CSI, and only feedback of wideband CSI is configured in CSI process 2 to define $k_1=4$ and $k_2=1$ in CSI process 1 and CSI process 2, respectively.

Alternatively, like LTE and PQI, when signaling of the (aperiodic) CSI request is configured with the RRC, different $k_i$, $k'_i$, or $T_i$ may be designated according to a combination of each CSI process (and feedback type and estimation method). In this case, different $k_i$, $k'_i$, or $T_i$ may be defined in the form of a table or a function according to the number of CSI processes which become targets of the corresponding (aperiodic) CSI request.

(Proposal 4)

Proposal 4 designates the CSI feedback timing as a UE capability.

The UE may inform the BS of its $k_i$ thereof through UE capability signaling according to its CSI calculation capability. The UE may inform the BS of different $k_1$, $k'_i$, or $T_i$ according to Proposals 1 to 3 or the elements (e.g., feedback type and estimation method) described therein.

Alternatively, the UE may inform CSI feedback timing $k$ which becomes a predetermined criterion and the BS may apply Proposals 1 to 3 including the corresponding criterion.

For example, the UE may inform only one minimum CSI feedback timing $k_i$ thereof and the BS may use Proposals 1 to 3 for defining/signaling each of $k_1$, $k'_i$, or $T_i$ considering the $k_i$ when using Proposals 1 to 3.

It is apparent that Proposals 1 to 4 described above may be similarly applied even to proposals to be described later.

That is, Proposals 1 to 4 may be applied to perform the method proposed in this specification by combining the proposals to be described later.

(Proposal 5)

Proposal 5 designates the CSI feedback timing according to the number of antenna ports.

The feedback timing may be differently set according to the number of ports of aperiodic CSI (ACSI)-reference signal (RS) to be measured, which corresponds to the aperiodic CSI request. That is, for the ACSIRS port number NP, a threshold value $N_{P\_Ki}$ (i=1, 2, ..., p−1, $N_{P\_K0}$=0) for distinguishing each group K is defined and $k_i$, $k'_i$, or $T_i$ may be designated for each group.

For example, if $N_{P\_Ki-1} < N_P <= N_{P\_Ki}$ is satisfied, the corresponding ACSIRS is included in group $K_1$ and in this case, $k_1$, $k'_i$, or $T_i$ may be used.

For example, two groups K are defined and are configured by the higher layer signaling from the BS or a predefined $N_{P\_K1}$ value is given, and when a port number N of the ACSIRS satisfies $N_P <= N_{P\_K1}$, the group K may be interpreted as group $K_1$ and when the port number $N_P$ of the ACSIRS satisfies $N_P > N_{P\_K1}$, the group K may be interpreted as group $K_2$.

Alternatively, when the aperiodic CSI request triggers the CSI feedback for one or more ACSIRS resources, total port number $N_{P\_total}$ or max port number $N_{P\_max}$ may be used as a criterion for distinguishing the group K in a similar scheme to the port number. In this case, further, instead of $N_{P\_Ki}$, a threshold value such as $N_{P\_total\_Ki}$ for the total port number and $N_{P\_max\_Ki}$ for the max port number may be defined.

Alternatively, when the aperiodic CSI request triggers aggregated CSI feedback for the ACSIRS transmitted in one or more instances, the total port number or max port number for the aggregated CSIRS may be used as the criterion for distinguishing the group K in the similar method to the port number.

Hereinafter, each group K may be used as a condition or a distinguishing unit for setting different $k_i$, $k'_i$, or $T_i$.

(Proposal 6)

Proposal 6 designates the CSI feedback timing according to the number of resources.

When a plurality of ACSIRS resources are defined in one CSI process and CSIs for two or more ACSIRS resources need to be calculated (e.g., CRI), the BS may differently set the feedback timing for the UE according to the number of ACSIRS resources to be measured, which corresponds to the aperiodic CSI request.

That is, for the ACSIRS port number NR, a value $N_{R\_Ki}$ (i=1, 2, ... p−1, $N_{R\_K0}$=0) for distinguishing each group K may be defined and $k_1$, $k'_i$, or $T_i$ may be designated for each group.

For example, if $N_{R\_Ki-1} < N_R <= N_{R\_Ki}$ is satisfied, the corresponding ACSIRS is included in group $K_i$ and in this case, the aperiodic CSI report timing may be used by using the designed $k_i$, $k'_i$, or $T_i$.

For example, two groups K are defined and are configured by the higher layer signaling from the BS or a predefined $N_{P\_K1}$ value is given, and when a resource number $N_R$ of the ACSIRS satisfies $N_R <= N_{R\_K1}$, the group K may be interpreted as group $K_1$, and when the resource number $N_R$ of the ACSIRS satisfies $N_R > N_{R\_K1}$, the group K may be interpreted as group $K_2$.

Alternatively, when the aperiodic CSI request triggers aggregated CSI feedback for the ACSIRS transmitted in one or more instances, the total resource number for the aggregated CSIRS may be used as the criterion for distinguishing the group K in the similar method to the resource number.

(Proposal 7)

Proposal 7 designates the CSI feedback timing according to the number of CSI processes.

When the BS instructs the UE to calculate (e.g., CA) CSI for two or more CSI processes, the BS may set the feedback timing to the UE differently according to the number of CSI processes corresponding to the aperiodic CSI request.

That is, for the CSI process number $N_C$ designated in the aperiodic CSI request, a value $N_{C\_Ki}$ (i=1, 2, ... p−1, $N_{C\_K0}=0$) for distinguishing each group K may be defined, respectively, and $k_i$, $k'_i$, or $T_i$ may be designated for each group.

For example, if $N_{C\_Ki-1} < N_C <= N_{C\_Ki}$ is satisfied, the corresponding ACSIRS is included in group $K_1$ and in this case, the aperiodic CSI report timing may be used by using the designed $k_i$, $k'_i$, or $T_i$.

For example, two groups K are defined and are configured by the higher layer signaling from the BS or a predefined $N_{C\_K1}$ value is given, and when a CSI process number $N_C$ of the ACSIRS satisfies $N_C <= N_{C\_K1}$, the group K may be interpreted as group $K_1$ and when the CSI process number $N_C$ of the ACSIRS satisfies $N_C > N_{C\_K1}$, the group K may be interpreted as group $K_2$.

Threshold values such as $N_{P\_Ki}$, $N_{P\_total\_Ki}$, $N_{P\_max\_Ki}$, $N_{R\_Ki}$, and $N_{C\_Ki}$ described above and $k_i$, $k'_i$, or $T_i$ for each group K may be designated to the UE by using L2 signaling such as MAC signaling for higher flexibility, instead of L3 signaling such as RRC signaling.

In particular, since flexibility of $k'_i$ which does not use dynamic signaling may be more important, a meaning of L2 signaling may be even greater.

In the (aperiodic) CSI request signaling through DCI described in Proposals 1 to 7, $K_i$ group to be fed back of the (aperiodic) CSI request may be implicitly designated to the UE according to the CSI feedback timing which the BS designates to the UE.

In this case, group $K_i$ to be fed back is defined according to a feedback timing T which the BS may designate to the UE and a range of T.

For example, T={1, 2, 3, 4} exists and in the case of {1, 2}, group $K_1$ may be designated and in the case of {3, 4}, group $K_2$ may be designated. In this case, when the BS transmits T=3 included in an (aperiodic) CSI indication, the UE may feed back the CSI included in group $K_2$ to n+3 and when the BS transmits T=1, the UE may feed back the CSI included in group $K_1$ to n+1.

The scheme described in Proposals 1 to 7 above may be interpreted differently in the PDCCH and the ePDCCH. For example, in signaling through the PDCCH, an indicated timing is used as it is, but a timing indicated through the ePDCCH may be interpreted as timing+1 (TTI).

Designation of CSI Processing Time Depending on Feedback Contents Based on ACSIRS Transmission Point In the contents, an environment when the aperiodic CSI-RS (ACSIRS) is transmitted to the UE together with the aperiodic CSI request is considered. That is, a time from an A-CSI-RS transmission point for calculating the CSI is the same as a time from a point of receiving the aperiodic CSI request.

However, when the transmission point of the ACSIRS is separated from the aperiodic CSI request, in a case where $k_1$ and $k_2$ for the feedback timing are defined from the aperiodic CSI request point, $k_1$ and $k_2$ may have a different meaning from the time required for calculating the CSI by using the actual ACSIRS. Therefore, $k_i$, k, and $T_i$ may be defined as a time from a point of transmission of the ACSIRS to a point of CSI feedback.

That is, a subframe (or a resource equivalent thereto) defined as the reference resource mentioned above is defined not as the point when the aperiodic CSI request is transmitted but the point when the ACSIRS is transmitted.

In this case, the indication of the ACSIRS may be classified into the following situations according to separation from the aperiodic CSI request.

(Case 1)

Case 1 relates to a method for indicating the ACSIRS transmission point to a DCI such as the aperiodic CSI request or to a separate DCI transmitted after the point.

Figure 6A:
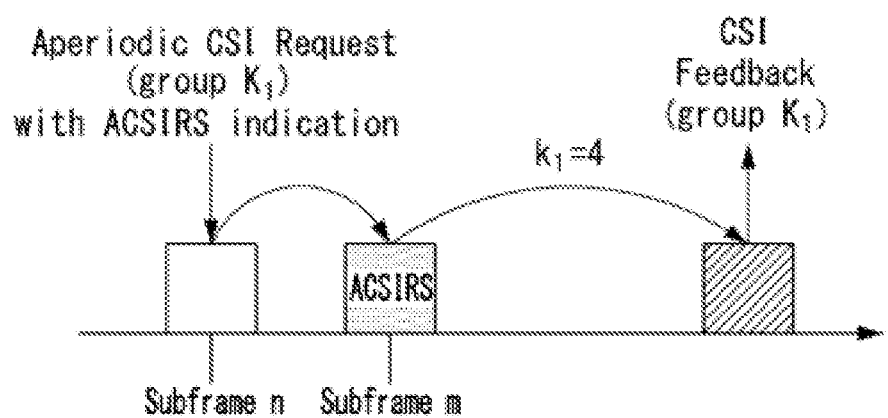
FIGS. 6A and 6B are views illustrating another example of a CSI feedback timing to which the present invention can be applied.
Figure 6B:
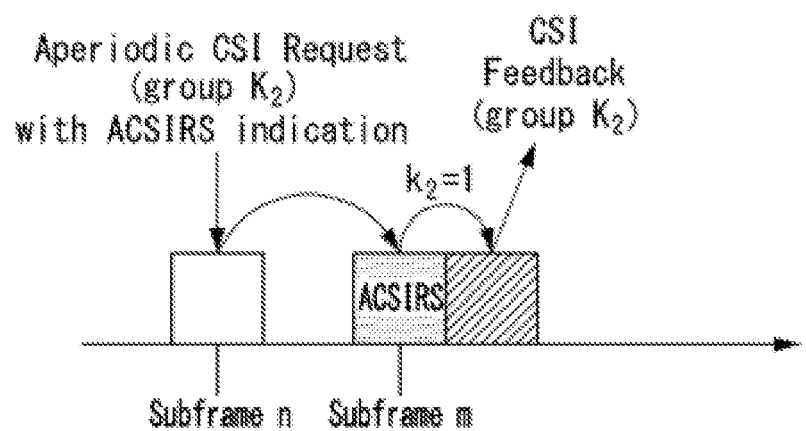

In this case, Proposals 1 to 4 above may be replaced with those in which $k_i$, k, and $T_i$ are defined from a transmission point m of the ACSIRS instead of an aperiodic CSI request point n. For example, if $k_i$ is defined for group $K_i$, the CSI feedback point may become m+$k_i$ as illustrated in FIGS. 6A and 6B instead of n+$k_i$ of the aforementioned contents.

Figure 7A:
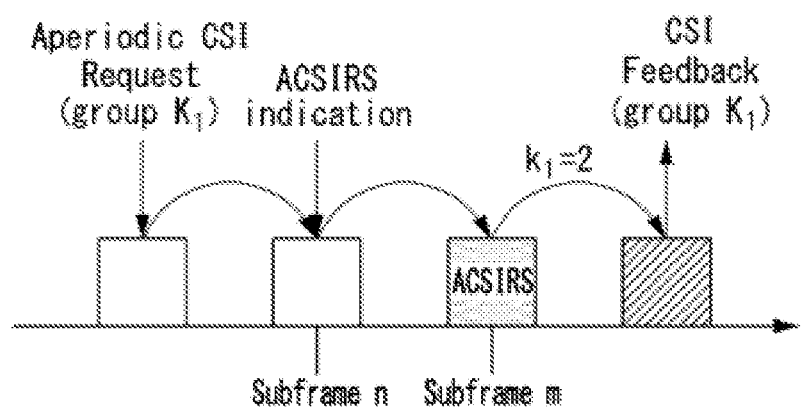
FIGS. 7A and 7B are views illustrating yet another example of a CSI feedback timing to which the present invention can be applied.
Figure 7B:
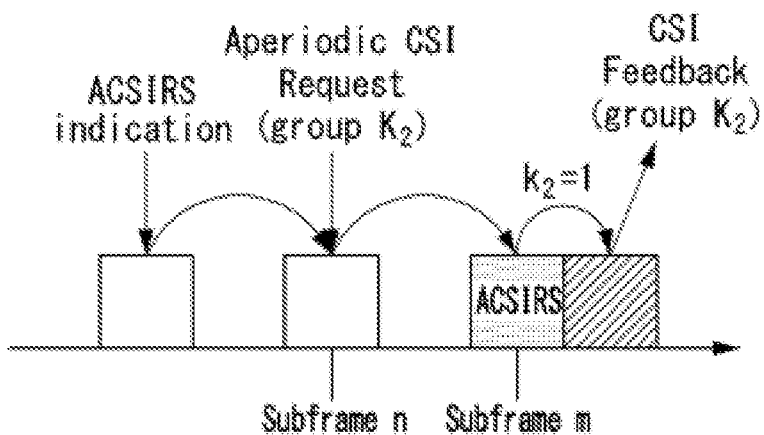

FIGS. 7A and 7B illustrate a case where the ACSIRS indication is transmitted to the separate DCI, but the corresponding DCI is transmitted at the same time as or later than the DCI including the aperiodic CSI request.

In this case, Proposals 1 to 4 of the aforementioned contents may also be replaced with those in which $k_i$, k, and $T_i$ are defined from a transmission point m of the ACSIRS instead of an aperiodic CSI request point n. However, unlike the example of FIGS. 6A and 6B, the aperiodic CSI request may designate the DCI to include the contents of the corresponding ACSIRS instead of directly designating the ACSIRS to be a reference resource.

(Case 2)

Case 2 refers to a case where a separate DCI (UL, DL) indicating the ACSI-RS precedes the aperiodic CSI request.

Figure 8A:
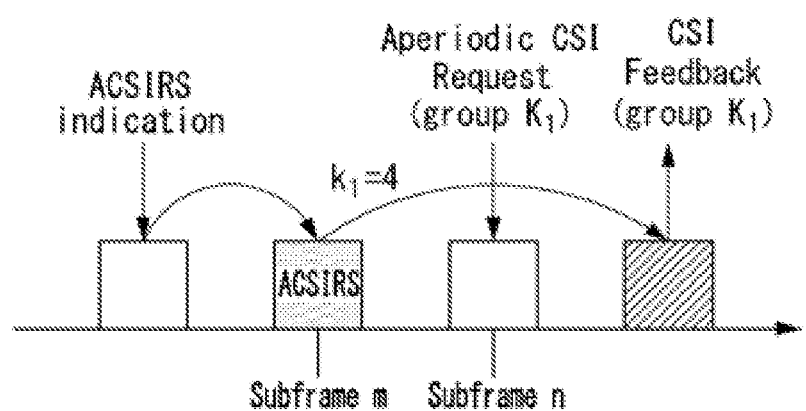
FIGS. 8A and 8B are views illustrating still yet another example of a CSI feedback timing to which the present invention can be applied.
Figure 8B:
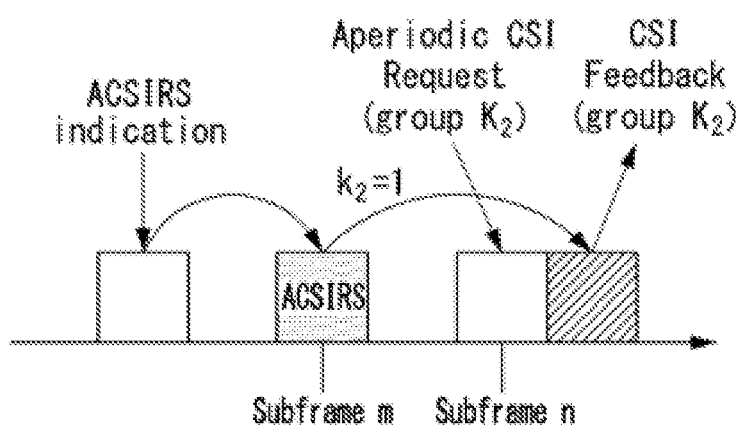

In this case, characteristically, the ACSI-RS may be transmitted earlier than the aperiodic CSI request. Therefore, as illustrated in FIGS. 8A and 8B, an aperiodic CSI report m+$k_i$ point may precede the aperiodic CSI request point. Accordingly, in this case, a minimum value $k_{min}$ at an actual aperiodic CSI report point may be defined. In this case, $k_{min}$ may be used as in (i) and (ii) below.

(i) The aperiodic CSI report point may be defined as Max (m+$k_i$, n+1).

(ii) In the case of m+$k_i$<n+1, the CSI report of group $K_i$ using the corresponding ACSI-RS is not performed.

When the BS transmits the (aperiodic) CSI request for group $K_i$ to the UE together with the CSI feedback point commonly to the two cases (e.g., common $T_i$ definition among the group K and index designation in the corresponding set), the ACSIRS needs to be transmitted before at least $k_i$ from the CSI feedback point.

Therefore, when the BS triggers to report the CSI of the group $K_i$, the UE does not expect the ACSIRS to be transmitted after ((aperiodic) CSI report point—$k_i$) and calculates the CSI by using the ACSIRS transmitted before the corresponding point.

When the BS transmits the APCSIRS after (AP CSI report point—$k_i$), the UE may omit the CSI report or report the CSI without updating the CSI.

Different CSI reporting timing (candidate value(s)) may be defined/set for a case using the aperiodic CSI-RS and a case using a periodic/semi-persistent CSI-RS in conjunction with the above schemes.

Specifically, when the aperiodic CSI-RS is used, CSI timing=0 (i.e., reporting A-CSI in the same subframe/slot in which the UE receives the A-CSI trigger) may not be allowed and when the periodic/semi-persistent CSI-RS is used, CSI timing=0 may be allowed.

The reason is that the CSI-RS transmitted in the previous subframe/slot may be used for calculating A-CSI in the case of the periodic/semi-persistent CSI-RS.

A similar scheme may also be applied to Type II codebook. Type II codebook as a scheme for reporting PMI to the BS with higher resolution than existing codebook has more computation amount than existing type I codebook.

Therefore, different CSI reporting timing (candidate value(s)) may be set when the PMI to be reported by the UE is type I codebook or type II codebook.

Specifically, in the case of type II codebook, a short CSI reporting timing (candidate value(s)) may not be defined/set.

Similarly, since a payload size for reporting type II codebook may be very large, part I/part II CSI is defined to reduce the payload size.

The UE may not report a part or the entirety of part II CSIs (e.g., subband CSI) according to a priority. In such a case, the computation amount of the CSI may be reduced for a reason similar to the above.

Accordingly, according to a case where the A-CSI includes only part I and a case where the A-CSI includes a part or the entirety of part II, different CSI reporting timing (candidate value(s)) may be defined/set. In such a scheme, since reporting of the part II CSI may be determined according to the payload size of the corresponding CSI, such a scheme may be implemented by a scheme in which different CSI reporting timing (candidate value(s)) are defined/set according to the payload size for reporting the A-CSI.

The aforementioned scheme is a scheme in which the CSI reporting timing (candidate value(s)) is defined/set by considering the CSI calculation capability of the UE. By a different scheme therefrom, the UE may report to the BS a 'CSI computation resource' required for actual calculation according to each CSI calculation, and as a result, the UE may appropriately designate the A-CSI reporting timing (candidate value(s)) by considering a CSI computation capability of the corresponding UE.

Such a CSI computation resource may be constituted by 1) a computation amount per unit time of the corresponding CSI and 2) a processor occupation time (this will be described in more detail in the example of FIGS. 12A to 12C). Alternatively, when the UE reports the 'computation amount per unit time of the corresponding CSI' to the BS, the UE may report to the BS a ratio to a maximum (per unit time) computation amount thereof.

Such a scheme may operated by assuming a scheme in which the UE reports to the BS a priority (e.g., time-first or processor-first) to allocate the corresponding CSI calculation together or uses one of two schemes (e.g., for minimum time consuming, a processor-first scheme is prioritized).

Figure 9:
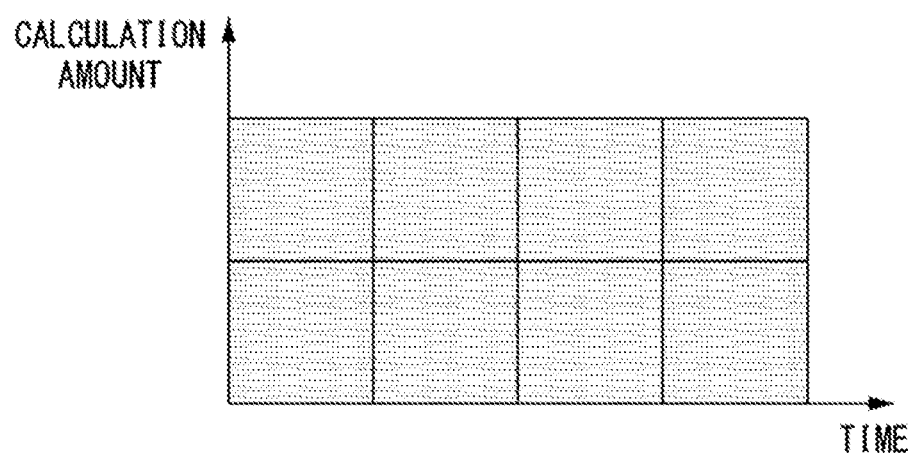
FIG. 9 is a view illustrating a CSI computation amount per unit time of a processor of a UE.

In addition, the UE may inform the BS (as UE capability) of the maximum (per unit time) computation amount of the processor thereof. As illustrated in FIG. 9, the maximum computation amount which represents a (CSI) computation amount per unit time may be appreciated similar to a height of a box expressed in FIG. 9. In other words, this may be appreciated like 'grid' in which each CSI to be described later is to be disposed.

Figure 12A:
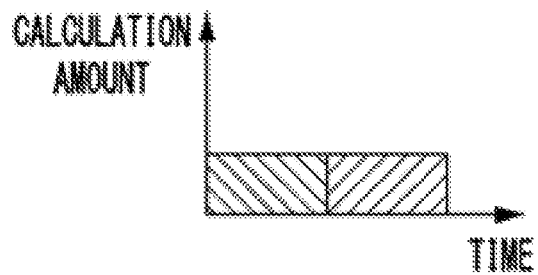
FIGS. 12A to 12C illustrate an example of computing capabilities of various processors.
Figure 12B:
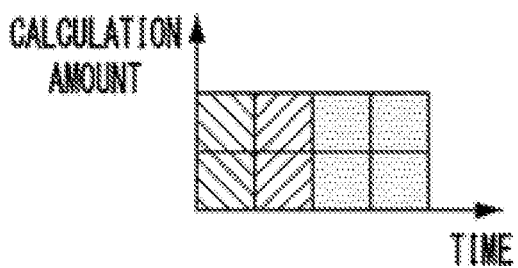
Figure 12C:
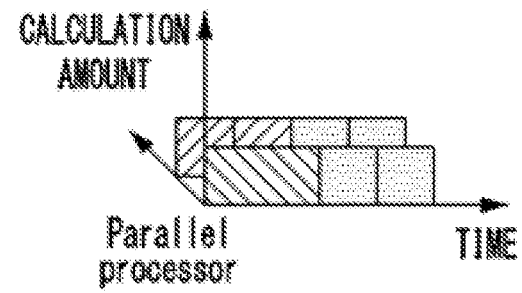

The processor may be occupied/used as in the example of FIGS. 12A to 12C according to a calculation amount and an occupation time of the CSI.

Figure 10:
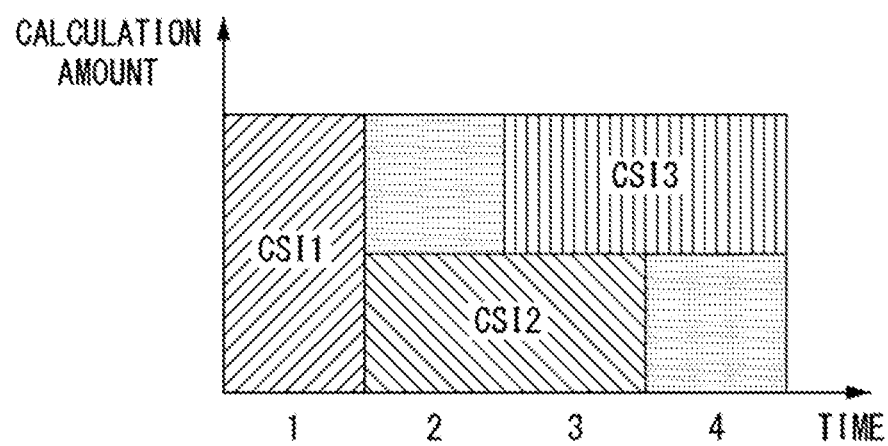
FIG. 10 is a view illustrating a CSI calculation assigned to a processor of a UE.

In FIG. 10, each block represents different CSI calculation and represents that each CSI calculation occupies a calculation capability/time as much as the above processor is illustrated by the corresponding block.

In the example of FIG. 10, at time 1, CSI 1 calculates the CSI by using calculation capabilities of all processors. At time 2, calculation of CSI 2 performs the calculation for two units of time by using half of the calculation capability of the corresponding processor and shares the calculation capability of the UE with calculation of CSI 3 which starts at time 3.

That is, the UE has a processor for a general computation (e.g., PUSCH processing using the corresponding processor) and/or a CSI-specific computation and the corresponding processor has a computation capability (e.g., expressed as a vertical axis in the above diagram) to process the calculation per time.

In this case, a time (e.g., represented as a horizontal axis in the above diagram) required for calculating a target CSI to be calculated by the UE may be equal to a value obtained by dividing the total computation amount required for the corresponding CSI calculation by the computation capability per unit time used in the corresponding CSI calculation by the corresponding processor.

The scheme that represents the calculation resource occupation of each CSI by the block as described above is a simplified representation of an actual situation (i.e., the calculation amount and the processor occupation time are not quantized). This is a scheme that quantizes the computation amount per unit time/the processor occupation time by specific granularity and represents the quantized computation amount per unit time/processor occupation time in order to more simply determine/transfer the computation amount per unit time/the processor occupation time used for actual CSI calculation in both the BS and the UE.

In this case, the quantized unit may become an absolute time (e.g., 1 ms), a slot, or a symbol as a time axis and such a scheme may be defined/configured in association with the subcarrier spacing of a bandwidth part (BWP) in which the measurement/calculation of the corresponding CSI is designated.

When a processing capability of the UE is reported to the BS, the UE may report the number of parallel processors thereof or/and the computation capability of each processor. For the UE, a type of processor the CSI calculation may be illustrated as the example of FIGS. 13A to 13C.

Figure 11A:
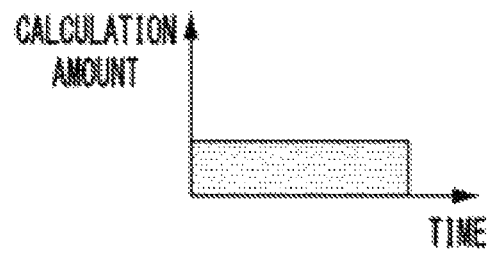
FIGS. 11A to 11C are views illustrating various processor types of a UE.
Figure 11B:
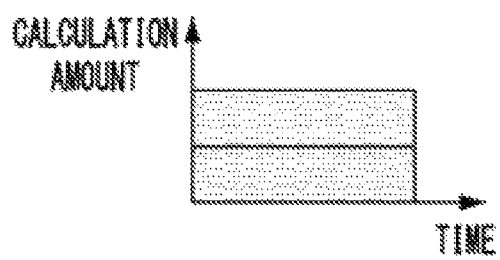
Figure 11C:
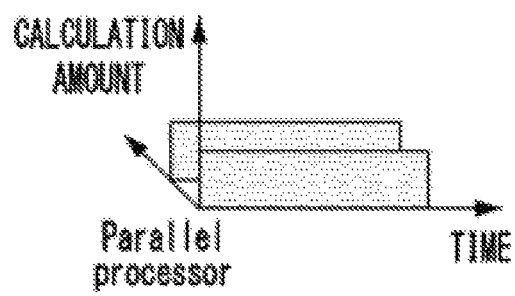

FIGS. 11A to 11C schematically illustrate the processor for each CSI calculation.

Hereinafter, FIG. 11A may mean UE including a processor illustrated in FIG. 13A, FIG. 11B may mean UE including processors illustrated in FIGS. 11A to 13B, and FIG. 11C may mean UE including processors illustrated in FIGS. 11A to 13C.

Based on FIG. 11A, in FIG. 11B, a processor which is two times larger is mounted and in FIG. 11C, two processors which are the same as those in FIG. 11A are mounted in parallel.

In this case, as illustrated in FIGS. 12A to 12C, based on FIG. 12A, in FIG. 12B, the calculation capability per unit time may be further increased (e.g., twice) and calculation which is two times more than the UE in FIG. 12A may be performed for the same time or the same calculation may be performed for half the time as compared with the UE in FIG. 12A.

Based on FIG. 12A, in FIG. 12C, two processors having the same calculation capability per unit time are provided, and as a result, calculation which is similar to the UE in FIG. 12B or is two times more than the UE in FIG. 12A may be performed for the same time or the same calculation may be performed for half the time as compared with the UE in FIG. 12A or 12B.

Figure 13A:
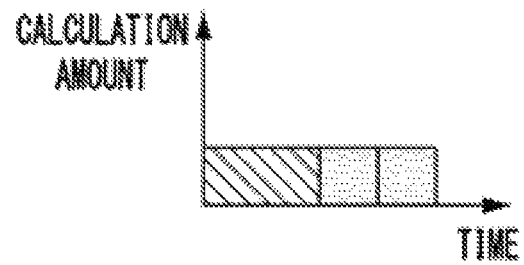
FIGS. 13A to 13C illustrate another example of computing capabilities of various processors.
Figure 13B:
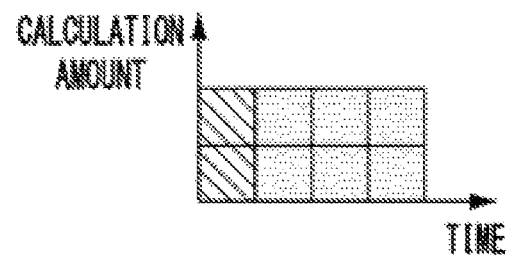
Figure 13C:
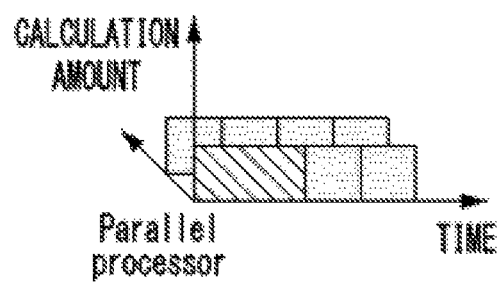

Referring to FIGS. 13A to 13C, when a difference between FIGS. 13B and 13C is described, in FIG. 13C, two independent calculations (e.g., different CSI processes or reporting setting) may be performed within half of the time as compared with FIG. 13A.

However, since one calculation may not be performed concurrently by two processors, when one complicated calculation is intended, a temporal gain may not be obtained at the corresponding calculation in FIG. 13C as compared with FIG. 13A. (e.g., in FIG. 13C, only one processor of two processors may be calculated for the CSI calculation and the remaining processor may be left idle without performing the calculation).

On the contrary, in FIG. 13B, the corresponding calculation may be performed in half of the time as compared with FIG. 13A regardless of one complicated calculation or two independent calculations.

For example, the UE in FIG. 13B and the UE in FIG. 13C may be different in calculating the CSI (e.g., CSI expressed as using two spaces as illustrated in FIG. 10) requiring two units of calculation.

On the contrary, since the case illustrated in FIG. 13C may be implemented more cheaply than one larger processor, the case may be preferred when implementing the UE.

Such a scheme may become a scheme in which the UE reports to the BS the CSI computation resource according to each reporting setting with respect to each reporting setting configured to the UE by the BS, instead of the UE capability.

Alternatively, similar to the scheme, the BS may receive a report as a meaning of a resource required for CSI measurement+CSI calculation instead of only the CSI calculation.

In such a scheme, the measurement and calculation of the CSI may be actually regarded as one processing and further, when the UE performs the measurement and calculation of the CSI concurrently, two types of operations may not be distinguished, so that it may be preferable that two types of operations are regarded as one. Simultaneously, a time required for processing for reporting the CSI to the PUSCH (or PUCCH) may be included.

In the above description, a case where an independent processor is configured for the purpose of calculating the CSI is mainly described, but on the contrary, the present invention may be similarly used even in a case where some or all of the corresponding processes are used even for another purpose (e.g., PUSCH transmission).

In such a case, the BS uses the corresponding processor for both the PUSCH and CSI calculation at the same time. Accordingly, similar to the above description, the CSI processing may be calculated by sharing computational power (e.g., computation resource) with the PUSCH processing (Thus, when the PUSCH and the CSI need to be concurrently processed, a time required for the CSI calculation/reporting may be longer than a case where only the CSI is processed).

In actual application of the above technique, the above techniques may be applied alone or in combination.

That is, the proposals or methods described above may be applied alone or in combination (or through joining) in order to provide the CSI feedback timing setting method proposed by this specification.

Further, in the above patent, for convenience of description, the proposed scheme based on the 3GPP LTE system has been described, but the scope of the system to which the proposed method is applied may be extended to other systems (e.g., UTRA, etc.) than the 3GPP LTE system, in particular 5G and candidate technology thereof.

Figure 14:
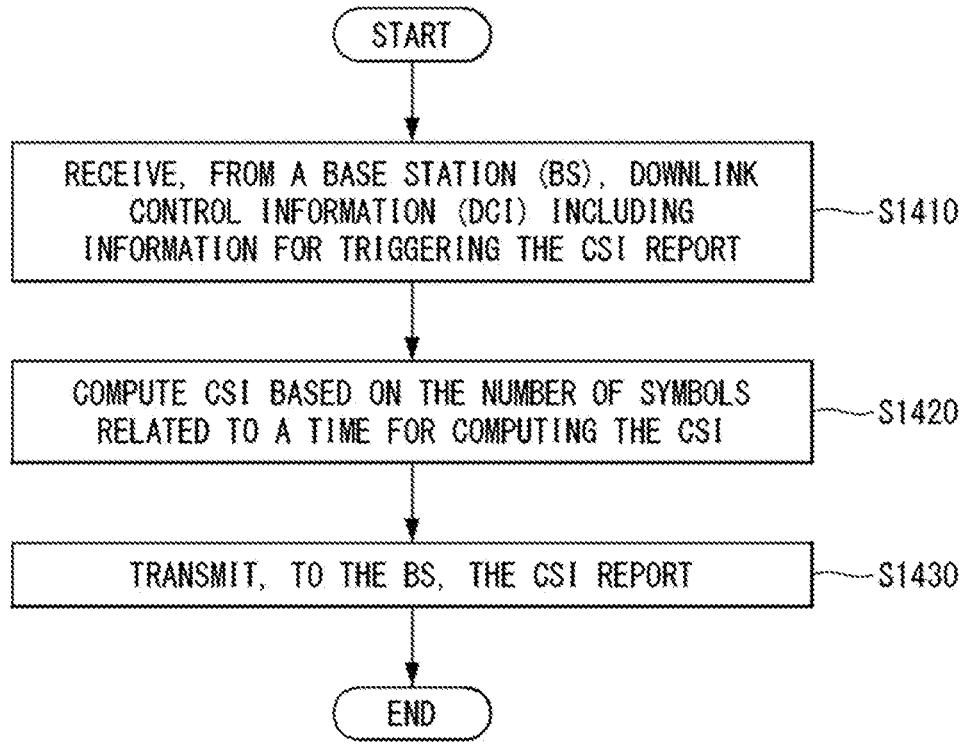
FIG. 14 is a flowchart illustrating an example of an operation method of a UE that performs CSI reporting proposed by this specification.

FIG. 14 is a flowchart illustrating an example of an operation method of a UE that performs CSI reporting proposed by this specification.

Referring to FIG. 14, in a method for transmitting, by a user equipment (UE), a CSI (Channel State Information) report in a wireless communication system, the method will be described.

The UE receives, from a base station, downlink control information (DCI) including information for triggering the CSI report (S1410).

In addition, the UE computes CSI based on the number of symbols related to a time for computing the CSI (S1420).

Further, the UE transmits, to the base station, the CSI report (S1430).

The number of symbols related to the time for computing the CSI may be defined based on information for the number of antenna ports, information for a CSI-RS resource, information for a bandwidth granularity, and information for a CSI codebook type.

The symbol related to the time for computing the CSI may be expressed as Z or Z'.

Here, Z' is related to a time other than a time of decoding DCI including information on triggering the CSI in Z.

Additionally, the UE may receive, from the base station, control information including at least one of the information for the number of antenna ports, the information for the CSI-RS resource, the information for the bandwidth granularity, and the information for the CSI codebook type.

The control information may be included in RRC signaling.

The bandwidth granularity may be related to a wideband or a subband.

The CSI codebook type may be related to CSI codebook type 1 or CSI codebook type 2.

Contents in which the method for reporting the CSI is implemented in the UE will be described based on FIGS. 14 and 16 to 19.

A UE for transmitting, a CSI (Channel State Information) report in the wireless communication system includes a radio frequency (RF) module for transmitting and receiving a radio signal; and a processor functionally connected to the RF module.

The processor of the UE controls the RF module to receive, from a base station, downlink control information (DCI) including information for triggering the CSI report.

In addition, the processor of the UE controls to compute CSI based on the number of symbols related to a time for computing the CSI.

Further, the processor of the UE controls the RF module to transmit the CSI report to the base station.

The number of symbols related to the time for computing the CSI may be defined based on information for the number of antenna ports, information for a CSI-RS resource, information for a bandwidth granularity, and information for a CSI codebook type.

Additionally, the processor of the UE may control the RF module to receive, from the base station, control information including at least one of the information for the number of antenna ports, the information for the CSI-RS resource, the information for the bandwidth granularity, and the information for the CSI codebook type.

The control information may be included in RRC signaling.

The bandwidth granularity may be related to a wideband or subband and the CSI codebook type may be related to CSI codebook type 1 or CSI codebook type 2.

Figure 15:
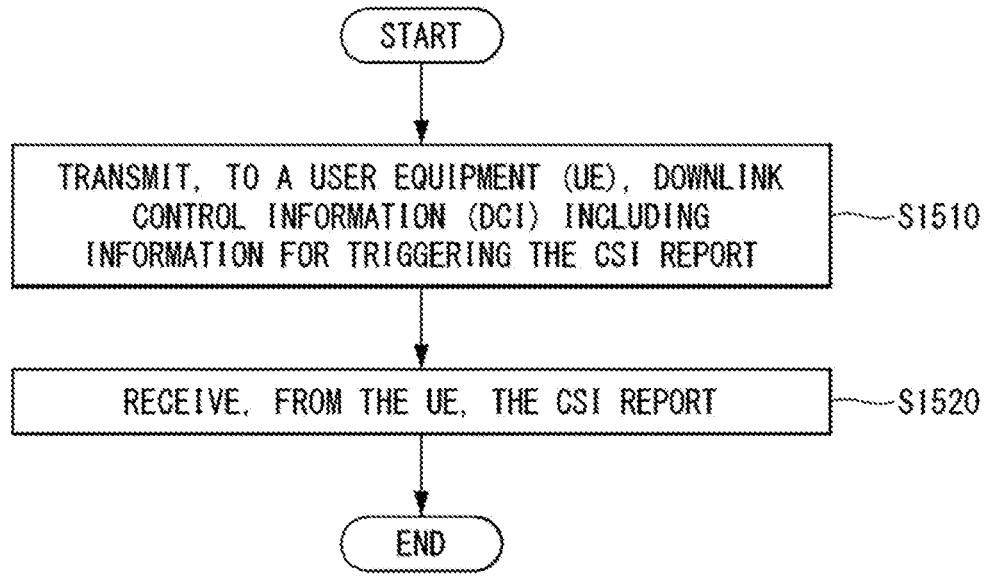
FIG. 15 is a flowchart illustrating an example of an operation method of an eNB that receives a CSI report proposed by this specification.

FIG. 15 is a flowchart illustrating an example of an operation method of an eNB that receives a CSI report proposed by this specification.

Referring to FIG. 15, in a method for receiving, by a base station (BS), a CSI (Channel State Information) report in a wireless communication system, the method will be described.

The BS transmits, to UE, downlink control information (DCI) including information for triggering the CSI report (S1510).

In addition, the BS receives the CSI report from the UE (S1520).

The number of symbols related to the time for computing the CSI may be defined based on information for the number of antenna ports, information for a CSI-RS resource, information for a bandwidth granularity, and information for a CSI codebook type.

Additionally, the BS may transmit, to the UE, control information including at least one of the information for the number of antenna ports, the information for the CSI-RS resource, the information for the bandwidth granularity, and the information for the CSI codebook type.

The control information may be included in RRC signaling.

The bandwidth granularity may be related to a wideband or subband and the CSI codebook type may be related to CSI codebook type 1 or CSI codebook type 2.

Contents in which the method for reporting the CSI is implemented in the eNB will be described based on FIGS. 15 to 19.

A base station (BS) for receiving a CSI (Channel State Information) report in the wireless communication system includes a radio frequency (RF) module for transmitting and receiving a radio signal; and a processor functionally connected to the RF module.

The processor of the BS controls the RF module to transmit, to UE, downlink control information (DCI) including information for triggering the CSI report.

Further, the processor of the BS controls the RF module to receive the CSI report from the UE.

The number of symbols related to the time for computing the CSI may be defined based on information for the number of antenna ports, information for a CSI-RS resource, information for a bandwidth granularity, and information for a CSI codebook type.

Additionally, the processor of the BS may control the RF module to transmit, to the UE, control information including at least one of the information for the number of antenna ports, the information for the CSI-RS resource, the information for the bandwidth granularity, and the information for the CSI codebook type.

The control information may be included in RRC signaling.

The bandwidth granularity may be related to a wideband or subband and the CSI codebook type may be related to CSI codebook type 1 or CSI codebook type 2.

Overview of Devices to which Present Invention is Applicable

Figure 16:
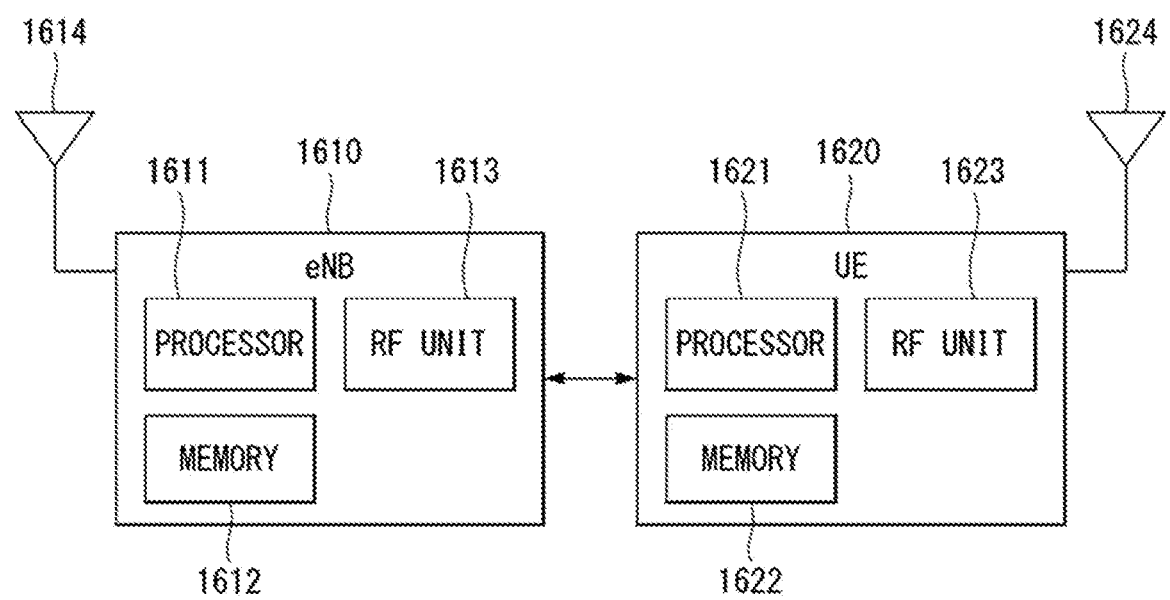
FIG. 16 illustrates a block diagram of a wireless communication device to which methods proposed by this specification can be applied.

FIG. 16 illustrates a block diagram of a wireless communication device to which methods proposed by this specification can be applied.

Referring to FIG. 16, a wireless communication system includes an eNB 1610 and multiple user equipments 1620 positioned within an area of the eNB.

Each of the eNB and the UE may be expressed as a wireless device.

The eNB includes a processor 1611, a memory 1612, and a radio frequency (RF) module 1613. The processor 1611 implements a function, a process, and/or a method which are proposed in FIGS. 1 to 15 above. Layers of a radio interface protocol may be implemented by the processor. The memory is connected with the processor to store various information for driving the processor. The RF module is connected with the processor to transmit and/or receive a radio signal.

The UE includes a processor 1621, a memory 1622, and an RF module 1623.

The processor implements a function, a process, and/or a method which are proposed in FIGS. 1 to 15 above. Layers of a radio interface protocol may be implemented by the processor. The memory is connected with the processor to store various information for driving the processor. The RF module is connected with the processor to transmit and/or receive a radio signal.

The memories 1612 and 1622 may be positioned inside or outside the processors 1611 and 1621 and connected with the processor by various well-known means.

Further, the eNB and/or the UE may have a single antenna or multiple antennas.

The antennas 1614 and 1624 serve to transmit and receive the radio signals.

Figure 17:
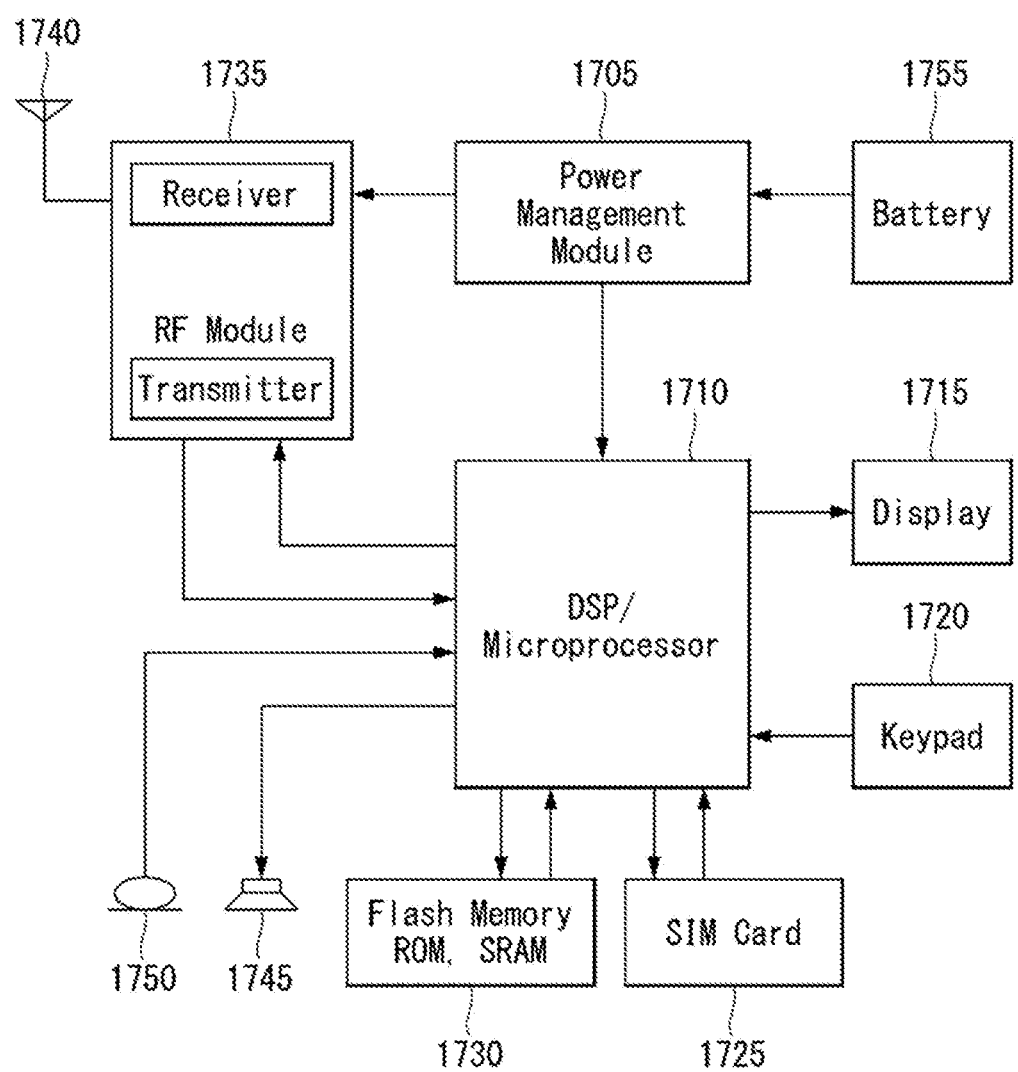
FIG. 17 illustrates a block diagram of a communication device according to an embodiment of the present invention.

FIG. 17 illustrates a block diagram of a communication device according to an embodiment of the present invention.

In particular, FIG. 17 is a diagram more specifically illustrating the UE of FIG. 16 above.

Referring to FIG. 17, the UE may be configured to include a processor (or a digital signal processor (DSP) 1710, an RF module (or RF unit) 1735, a power management module 1705, an antenna 1740, a battery 1755, a display 1715, a keypad 1720, a memory 1730, a subscriber identification module (SIM) card 1725 (this component is optional), a speaker 1745, and a microphone 1750. The UE may also include a single antenna or multiple antennas.

The processor 1710 implements a function, a process, and/or a method which are proposed in FIGS. 1 to 15 above. The layers of the wireless interface protocol may be implemented by the processor.

The memory 1730 is connected with the processor and stores information related with an operation of the processor. The memory may be positioned inside or outside the processor and connected with the processor by various well-known means.

A user inputs command information such as a telephone number or the like by, for example, pressing (or touching) a button on the keypad 1720 or by voice activation using the microphone 1750. The processor receives such command information and processes to perform appropriate functions including dialing a telephone number. Operational data may be extracted from the SIM card 1725 or the memory 1730. In addition, the processor may display command information or drive information on the display 1715 for the user to recognize and for convenience.

The RF module 1735 is connected with the processor to transmit and/or receive an RF signal. The processor transfers the command information to the RF module to initiate communication, for example, to transmit radio signals constituting voice communication data.

The RF module is constituted by a receiver and a transmitter for receiving and transmitting the radio signals. The antenna 1740 functions to transmit and receive the radio signals. Upon receiving the radio signals, the RF module may transfer the signal for processing by the processor and convert the signal to a baseband. The processed signal may be converted into to audible or readable information output via the speaker 1745.

Figure 18:
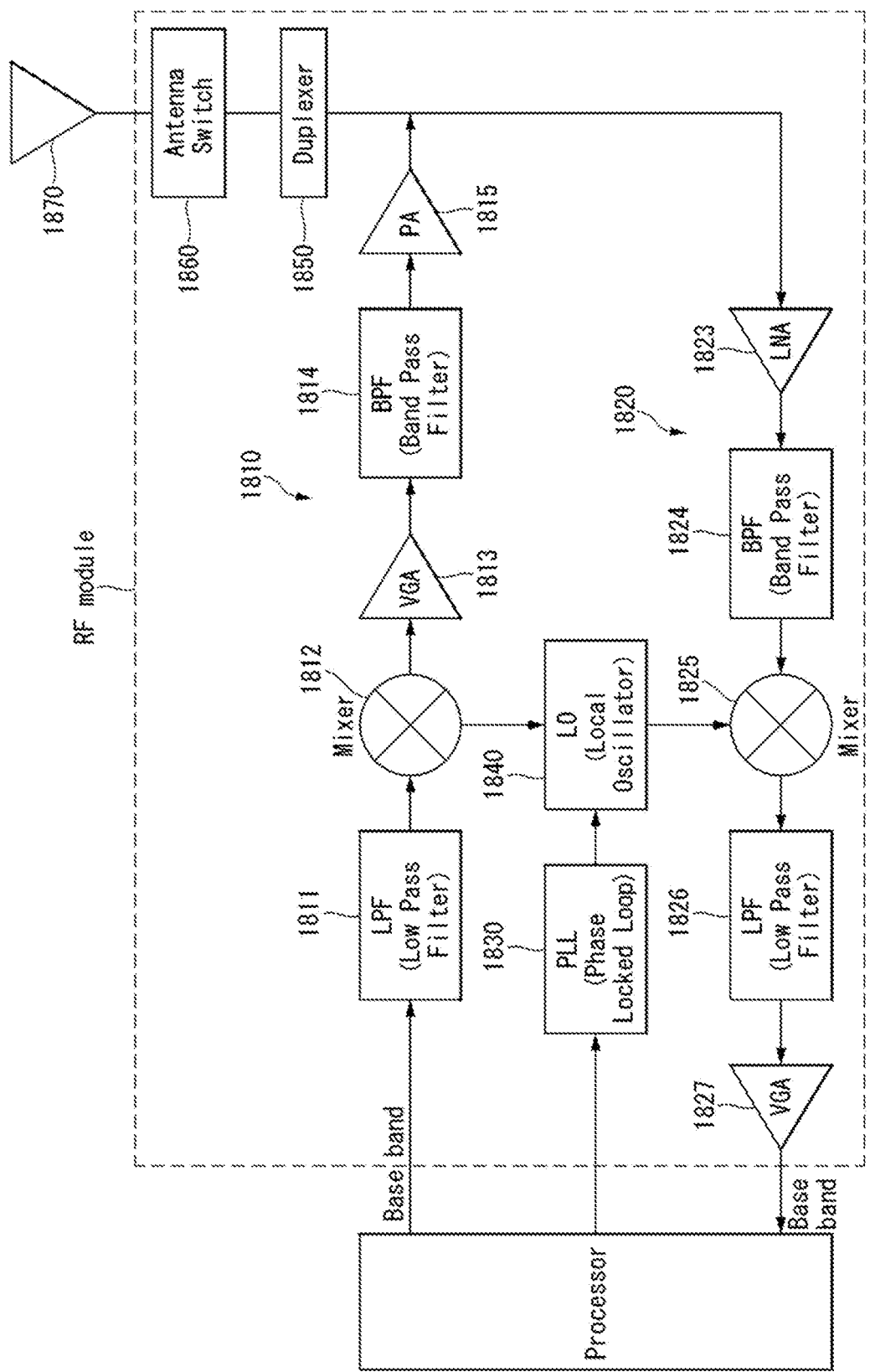
FIG. 18 is a diagram illustrating an example of an RF module of the wireless communication device to which a method proposed by this specification can be applied.

FIG. 18 is a diagram illustrating an example of an RF module of the wireless communication device to which the method proposed by this specification can be applied.

Specifically, FIG. 18 illustrates an example of an RF module that may be implemented in a frequency division duplex (FDD) system.

First, in a transmission path, the processors described in FIGS. 16 and 17 process the data to be transmitted and provide an analog output signal to the transmitter 1810.

Within the transmitter 1810, the analog output signal is filtered by a low pass filter (LPF) 1811 to remove images caused by a digital-to-analog conversion (ADC) and up-converted to an RF from a baseband by an up-converter (mixer) 1812, and amplified by a variable gain amplifier (VGA) 1813 and the amplified signal is filtered by a filter 1814, additionally amplified by a power amplifier (PA) 1815, routed through a duplexer(s) 1850/an antenna switch(es) 1860, and transmitted through an antenna 1870.

In addition, in a reception path, the antenna receives signals from the outside and provides the received signals, which are routed through the antenna switch(es) 1860/duplexers 1850 and provided to a receiver 1820.

In the receiver 1820, the received signals are amplified by a low noise amplifier (LNA) 1823, filtered by a bans pass filter 1824, and down-converted from the RF to the baseband by a down-converter (mixer) 1825.

The down-converted signal is filtered by a low pass filter (LPF) 2227 and amplified by a VGA 2227 to obtain an analog input signal, which is provided to the processors described in FIGS. 16 and 17.

Further, a local oscillator (LO) generator 1840 also provides transmitted and received LO signals to the up-converter 1812 and the down-converter 1825, respectively.

In addition, a phase locked loop (PLL) 1830 receives control information from the processor to generate the transmitted and received LO signals at appropriate frequencies and provides control signals to the LO generator 1840.

Further, circuits illustrated in FIG. 18 may be arranged differently from the components illustrated in FIG. 18.

Figure 19:
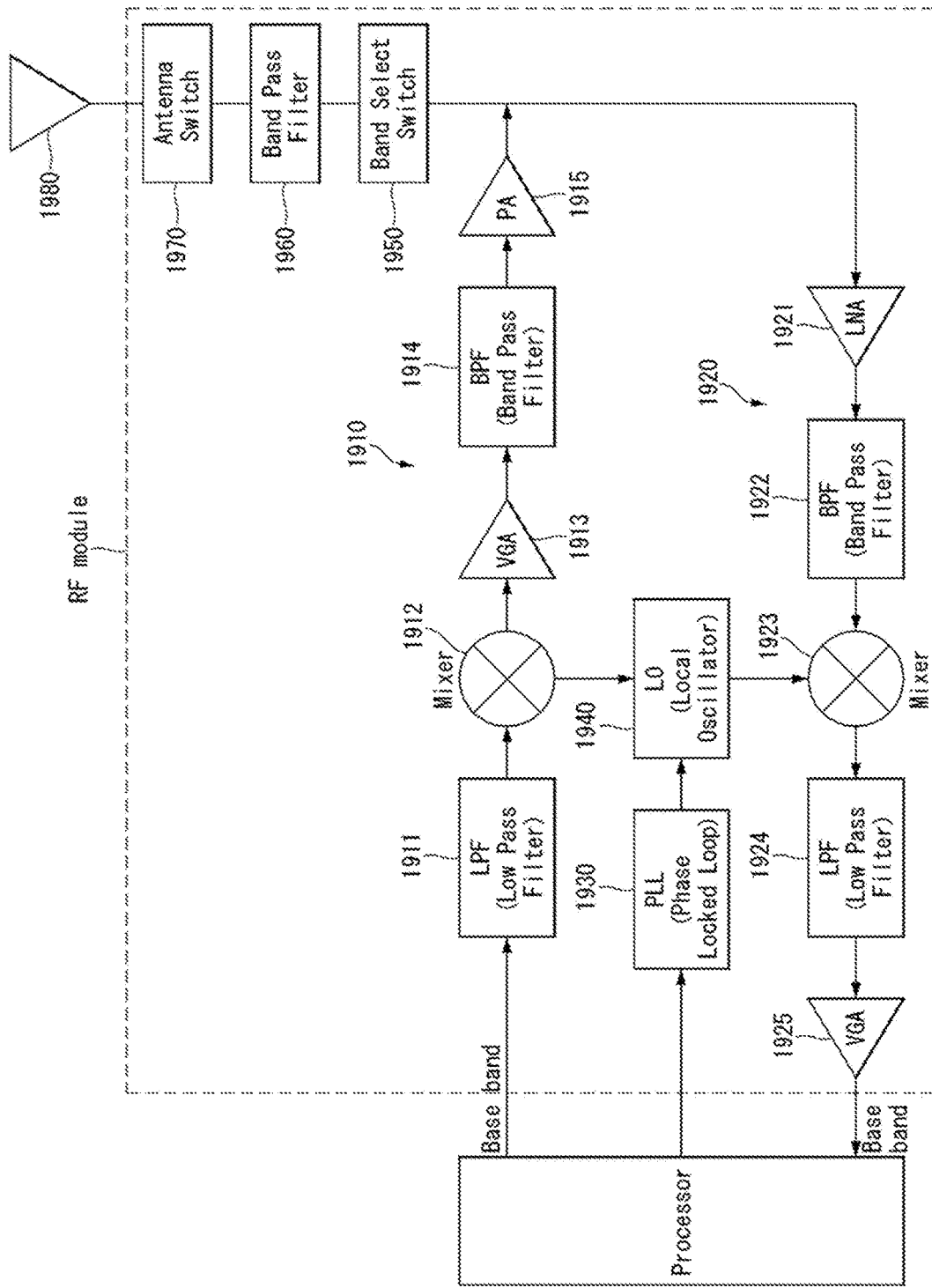
FIG. 19 is a diagram illustrating another example of the RF module of the wireless communication device to which a method proposed by this specification can be applied.

FIG. 19 is a diagram illustrating another example of the RF module of the wireless communication device to which the method proposed by this specification can be applied.

Specifically, FIG. 19 illustrates an example of an RF module that may be implemented in a time division duplex (TDD) system.

A transmitter 1910 and a receiver 1920 of the RF module in the TDD system are identical in structure to the transmitter and the receiver of the RF module in the FDD system.

Hereinafter, a difference between the RF module of the TDD system and the RF module of the FDD system will be described.

A signal amplified by a power amplifier (PA) 1915 of the transmitter is routed through a band select switch 1950, a band pass filter (BPF) 1960, and an antenna switch(es) 1970 and transmitted via an antenna 1980.

In addition, in a reception path, the antenna receives signals from the outside and provides the received signals, which are routed through the antenna switch(es) 1970, the band pass filter 1960, and the band select switch 1950 and provided to the receiver 1920.

The above-described embodiments are results in which the elements and characteristics of the present invention are combined in a specific form. Each of the element or characteristics has to be considered as being optional unless otherwise explicitly described. Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or characteristics of one embodiment may be included in the other embodiment or may be replaced with elements or characteristics corresponding to the other embodiment. It is evident that in the claims, embodiments may be constructed by combining claims not having an explicit citation relation or the claims not having an explicit citation relation may be included in a new claim according to amendments after an application.

The embodiments of the present invention may be implemented by various means, for example, hardware, firmware, software, or any combinations thereof. For hardware implementation, methods according to embodiments of the present disclosure described herein may be implemented by one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

For firmware or software implementation, the methods according to embodiments of the present disclosure may be implemented in the form of a module, a procedure, a function, or the like, performing the foregoing functions or operations. Software codes may be stored in a memory unit and driven by a processor. The memory unit may be positioned within or outside of the processor and exchange data with the processor through various known means.

The present invention may be materialized in a specific form without departing from the spirit and essential characteristics of the present invention. Accordingly, the detailed description should not be interpreted as being limited from all aspects, but should be considered as being illustrative. The scope of the present invention should be determined by reasonable analysis of the attached claims, and all changes within an equivalent range of the present invention fall within the scope of the present invention. Furthermore, in the claims, embodiments may be constructed by combining claims not having an explicit citation relation or the claims not having an explicit citation relation may be included in a new claim according to amendments after an application.

INDUSTRIAL APPLICABILITY

The method of allocating resource in a wireless communication system of the present invention has been described on the basis of an example applied to a 3GPP LTE/LTE-A system, but the method of allocating resource may also be applied to various other wireless communication systems, as well as to the 3GPP LTE/LTE-A system.

The invention claimed is:

1. A method of receiving, by a base station (BS), Channel State Information (CSI) in a wireless communication system, the method comprising:

transmitting, to a user equipment (UE), downlink control information (DCI) including information for triggering an aperiodic CSI report; and receiving, from the UE, the CSI including a Precoding Matrix Indicator (PMI), wherein a number of symbols related to a time for computing the CSI is defined based on (i) information for the number of antenna ports, (ii) information for a Channel State Information-Reference Signal (CSI-RS) resource, (iii) information for a bandwidth granularity, (iv) information for a CSI codebook type, and (v) information for a number of processors, wherein the information for the CSI codebook type is information regarding whether the PMI is based on a type 1 codebook or a type 2 codebook.

2. The method of claim 1, further comprising:
transmitting, to the UE, configuration information including at least one of (i) the information for the number of antenna ports, (ii) the information for the CSI-RS resource, (iii) the information for the bandwidth granularity, or (iv) the information for the CSI codebook type.

3. The method of claim 2, wherein the configuration information is included in radio resource control (RRC) information.

4. The method of claim 1, wherein the information for the bandwidth granularity is information regarding whether the CSI is based on a wideband or a subband.

5. A base station (BS) configured to receive Channel State Information (CSI) in a wireless communication system, the BS comprising:
a transmitter and a receiver;
at least one processor operably connectable to the transmitter and the receiver; and
at least one computer memory operably connectable to the at least one processor and storing instructions that, when executed by the at least one processor, perform operations comprising:
transmitting, to a user equipment (UE) through the transmitter, downlink control information (DCI) including information for triggering an aperiodic CSI report; and
receiving, from the UE through the receiver, the CSI including a Precoding Matrix Indicator (PMI),
wherein a number of symbols related to a time for computing the CSI is defined based on (i) information for the number of antenna ports, (ii) information for a Channel State Information-Reference Signal (CSI-RS) resource, (iii) information for a bandwidth granularity, (iv) information for a CSI codebook type, and (v) information for a number of processors,
wherein the information for the CSI codebook type is information regarding whether the PMI is based on a type 1 codebook or a type 2 codebook.

6. The BS of claim 5, wherein the operations further comprise:
transmitting, to the UE through the transmitter, configuration information including at least one of (i) the information for the number of antenna ports, (ii) the information for the CSI-RS resource, (iii) the information for the bandwidth granularity, or (iv) the information for the CSI codebook type.

7. The BS of claim 6, wherein the configuration information is included in radio resource control (RRC) information.

8. The BS of claim 5, wherein the information for the bandwidth granularity is information regarding whether the CSI is based on a wideband or a subband.

9. A processing device configured to control a base station (BS) to receive Channel State Information (CSI) in a wireless communication system, the processing device comprising:
at least one processor; and
at least one computer memory operably connectable to the at least one processor and storing instructions that, when executed by the at least one processor, perform operations comprising:
transmitting, to a user equipment (UE), downlink control information (DCI) including information for triggering an aperiodic CSI report; and
receiving, from the UE, the CSI including a Precoding Matrix Indicator (PMI),
wherein a number of symbols related to a time for computing the CSI is defined based on (i) information for the number of antenna ports, (ii) information for a Channel State Information-Reference Signal (CSI-RS) resource, (iii) information for a bandwidth granularity, (iv) information for a CSI codebook type, and (v) information for a number of processors,
wherein the information for the CSI codebook type is information regarding whether the PMI is based on a type 1 codebook or a type 2 codebook.

10. The processing device of claim 9, wherein the operations further comprise:
transmitting, to the UE, configuration information including at least one of (i) the information for the number of antenna ports, (ii) the information for the CSI-RS resource, (iii) the information for the bandwidth granularity, or (iv) the information for the CSI codebook type.

11. The processing device of claim 10, wherein the configuration information is included in radio resource control (RRC) information.

12. The processing device of claim 9, wherein the information for the bandwidth granularity is information regarding whether the CSI is based on a wideband or a subband.

* * * * *